(12) United States Patent
Kakutani

(10) Patent No.: US 9,832,350 B2
(45) Date of Patent: Nov. 28, 2017

(54) IMAGE PROCESSING APPARATUS, PRINTING APPARATUS, IMAGE PROCESSING METHOD, AND PRINTING METHOD

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/079,408

(22) Filed: Mar. 24, 2016

(65) Prior Publication Data
US 2016/0295077 A1   Oct. 6, 2016

(30) Foreign Application Priority Data

Apr. 6, 2015   (JP) ................ 2015-077397

(51) Int. Cl.
| | | |
|---|---|---|
| H04N 1/405 | (2006.01) | |
| H04N 1/60 | (2006.01) | |
| H04N 1/52 | (2006.01) | |
| G06K 15/02 | (2006.01) | |

(52) U.S. Cl.
CPC ....... *H04N 1/6027* (2013.01); *G06K 15/1881* (2013.01); *H04N 1/4057* (2013.01); *H04N 1/52* (2013.01); *H04N 1/6008* (2013.01); *G06K 2215/101* (2013.01)

(58) Field of Classification Search
None
See application file for complete search history.

(56) References Cited

U.S. PATENT DOCUMENTS

| | | | |
|---|---|---|---|
| 7,929,183 B2 | 4/2011 | Kakutani | |
| 8,842,340 B2 | 9/2014 | Kakutani | |
| 2005/0206920 A1* | 9/2005 | Yamazaki | G06K 15/02 358/1.8 |
| 2007/0058211 A1* | 3/2007 | Kubota | H04N 1/40062 358/462 |
| 2014/0071504 A1* | 3/2014 | Kuno | H04N 1/00015 358/505 |
| 2015/0062656 A1* | 3/2015 | Asai | H04N 1/4053 358/3.1 |

FOREIGN PATENT DOCUMENTS

| | | |
|---|---|---|
| JP | 4225319 B2 | 2/2009 |
| JP | 2013-115748 A | 6/2013 |

* cited by examiner

*Primary Examiner* — Helen Q Zong
(74) *Attorney, Agent, or Firm* — Global IP Counselors, LLP

(57) ABSTRACT

An image processing method includes performing first halftone processing and second halftone processing. The second halftone processing is performed, for a second kind of color in advance among a plurality of colors constituting an original image, in units of blocks each consisting of a plurality of pixels that constitute the original image and the second kind of color is converted into an amount of second kind of ink corresponding to the second kind of color among the plurality of inks. The first halftone processing is performed, for the first kind of color, for each pixel that constitutes the original image or each pixel group having a smaller number of pixels than the block and the first kind of color is converted into an amount of first kind of ink corresponding to the first kind of color among the plurality of inks.

15 Claims, 19 Drawing Sheets

FIG. 3A
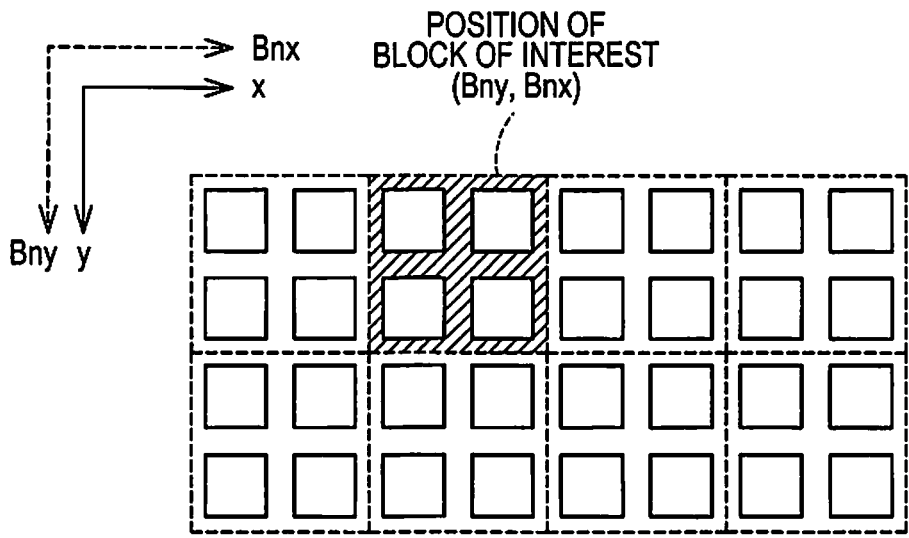
FIG. 3B
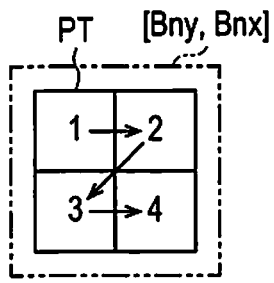
FIG. 3C
| PT | y | x |
|---|---|---|
| 1 | 2*Bny | 2*Bnx |
| 2 | 2*Bny | 2*Bnx + 1 |
| 3 | 2*Bny + 1 | 2*Bnx |
| 4 | 2*Bny + 1 | 2*Bnx + 1 |

FIG. 20

| CODED NUMBER DATA | NUMBER OF DOTS | | |
|---|---|---|---|
| | LARGE | MEDIUM | SMALL |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |

FIG. 21A

CLASSIFICATION NUMBER:
SEQUENCE VALUE MATRIX OF NUMBER 1

| 1 | 6 | 3 | 5 |
|---|---|---|---|
| 8 | 4 | 7 | 2 |

FIG. 21B

CLASSIFICATION NUMBER:
SEQUENCE VALUE MATRIX OF NUMBER 2

| 3 | 6 | 4 | 5 |
|---|---|---|---|
| 8 | 1 | 7 | 2 |

FIG. 21C

CLASSIFICATION NUMBER:
SEQUENCE VALUE MATRIX OF NUMBER 3

| 6 | 4 | 1 | 7 |
|---|---|---|---|
| 2 | 8 | 5 | 3 |

FIG. 21D

CLASSIFICATION NUMBER:
SEQUENCE VALUE MATRIX OF NUMBER 452

| 7 | 2 | 8 | 1 |
|---|---|---|---|
| 4 | 6 | 3 | 5 |

IMAGE PROCESSING APPARATUS, PRINTING APPARATUS, IMAGE PROCESSING METHOD, AND PRINTING METHOD

This application claims priority to Japanese Patent Application No. 2015-077397 filed on Apr. 6, 2015. The entire disclosure of Japanese Patent Application No. 2015-077397 is hereby incorporated herein by reference.

BACKGROUND

1. Technical Field

The invention relates to a technique for processing an image and a technique for printing the image.

2. Related Art

In recent years, a so-called halftone technique in which an image with the larger number of gradations is displayed or printed using a recording method with the number of gradations smaller than that of the image has significantly advanced in the image processing field. In such a halftone technique, speeding up of processing and improvement in an image quality is required, and how to balance both the speeding up of the processing and the improvement in the image quality has always been an issue in hardware resources having limited capability.

Such balancing is required at various levels. For example, when a dither method and an error diffusion method are cited as a representative example of a halftone method, the former is capable of performing processing at high speed but requires various contrivances for improving the image quality, and the latter is capable of making image quality higher, but it takes a time for the processing and also requires a buffer which temporarily stores an error.

In the meantime, when paying attention to unit for the image processing, a method of processing pixels in a pixel-by-pixel manner and a method of processing a plurality of pixels collectively are considered. In the former, the higher image quality may be easily achieved, but as the resolution becomes higher, the number of pixels to be processed becomes huge. In the latter, the number of pixels to be processed can be suppressed, but the image quality is degraded by the same extent of the suppression. Assuming that a computer that prepares an image and a printer that prints the image are connected to each other, when the computer having a high processing capability performs halftoning, there is a case in which the processing can be sped up but an amount of data to be transferred to the printer becomes increased to the point that the data transfer becomes bottlenecked.

The inventors have developed various methods to balance such problems among given hardware resources, and have developed and suggested a method for balancing a dither method and an error diffusion method (see JP-A-2013-115748), a method for processing a plurality of pixels collectively at high speed and with high image quality (see Japanese Patent No. 4225319), or the like.

These methods are excellent methods that optimize high-speed processing and achievement of high image quality under a predetermined condition, but there is room for improvement in the optimization for a case where various types of inks (color ink or monochromatic multi-gradation ink) and the like are used.

SUMMARY

An advantage of some aspects of the invention is to realize appropriate image processing such as high-speed processing, processing with high image quality, or the like, under a predetermined condition by using a plurality of halftone processing according to a color.

(1) According to an aspect of the invention, there is provided an image processing apparatus which converts an original image into a representation obtained by using a plurality of inks. The image processing apparatus may include a first halftone unit which performs first halftone processing which is determined in advance and a second halftone unit which performs second halftone processing which is different from the first halftone processing. The second halftone unit may perform the second halftone processing, for a second kind of color which is a color other than a first kind of color which is a single color or a plurality of colors determined in advance among a plurality of colors constituting the original image, in units of blocks each consisting of a plurality of pixels that constitute the original image and convert the second kind of color into an amount of the second kind of ink corresponding to the second kind of color among the plurality of inks. Furthermore, the first halftone unit may perform the first halftone processing, for the first kind of color, for each pixel that constitutes the original image or each pixel group having a smaller number of pixels than the block and convert the first kind of color into an amount of first kind of ink corresponding to the first kind of color among the plurality of inks.

According to the image processing apparatus, the first halftone processing can be performed for each pixel that constitutes the original image or each pixel group having a smaller number of pixels than the block, for the first kind of color which is determined in advance, and the second halftone processing can be performed, for a second kind of color which is a color other than a first kind of color, in units of blocks each consisting of a plurality of pixels that constitute the original image. Furthermore, since the first halftone processing is processing different from the second halftone processing, regarding the first kind of color and the second kind of color, it is possible to appropriately use processing which is performed in units of blocks and processing which is not performed in units of blocks.

(2) In the image processing apparatus, the first halftone processing performed by the first halftone unit may be processing with image quality higher than the second halftone processing performed by the second halftone unit. In such a case, the first halftone processing can be performed for each pixel that constitutes the original image or each pixel group having a smaller number of pixels than the block and the processing with the higher image quality can be easily realized.

(3) The first kind of color may include at least a black color. According to the image processing apparatus, since it is possible to process the black color or the first kind of color including the black color by the first halftone processing, individual processing can be performed on the black color to perform the halftone processing on, for example, characters or lines that are often represented by the black color, according to the properties of the characters or the lines. The first kind of color can be a single color or a plurality of colors determined in advance, such as the primary colors of red, green, and blue, besides the black color.

(4) Also, the first kind of color may include only the black color. In such a case, since the first kind of color includes only the black color, the processing can be completed in a short time.

(5) In such an image processing apparatus, the halftone processing may be processing which directly determines whether or not dots are to be formed by the first kind of ink corresponding to the first kind of color on the basis of a gradation value of the first kind of color. In such a case, for the first kind of color, since it is possible to directly determine whether or not dots are to be formed by the first kind of ink corresponding to the first kind of color on the basis of a gradation value of the first kind of color, it is possible to enhance color reproducibility of the first kind of color in the original image.

(6) In the image processing apparatus, the second halftone processing performed by the second halftone unit may be processing performed at a higher speed than the first halftone processing performed by the first halftone unit. In such a case, it is possible to perform processing at a higher speed since the processing in the second halftone unit is performed in units of blocks.

(7) In the image processing apparatus, the second halftone processing may be processing of comparing a threshold value stored in a dither mask and with the gradation value of the second kind of color, in units of the blocks. According to the image processing apparatus, it is possible to form an image by reflecting characteristics of the dither mask, for the second kind of color, by comparing the threshold value with the second kind of color.

(8) The second halftone unit may be configured to perform the processing for the second kind of color using an average value of the plurality of pixels within the block. In the image processing apparatus, since the processing is performed using the average value of the plurality of pixels, it is possible to perform the second halftone processing at a higher speed.

(9) The first halftone unit may be configured to determine, for the first kind of color, whether or not the first kind of color is present in any of the pixels within the block and perform the first halftone processing only on the pixel in which the first kind of color is present. In the image processing apparatus, since the first halftone processing is not performed on the pixel in which the first kind of color is not present within the block, it is possible to further speed up the processing performed by the first halftone unit.

(10) In the image processing apparatus, the first halftone processing by the first halftone unit and the second halftone processing by the second halftone unit may be performed for all the pixels of the original image and an ink amount of the second kind of ink may be replaced with the ink amount of the first kind of ink for the pixel in which the ink amount of an ink corresponding to the first kind of color which is the processing result is not zero. In the image processing apparatus, since it is not necessary to determine whether or not the first halftone processing is to be performed, the processing time required for the determination can be reduced. Further, since the condition determination is reduced, the apparatus can be easily realized by hardware in its entirety.

(11) In the image processing apparatus, the first halftone unit may perform the first halftone processing by defining a color of all the pixels as the first kind of color in a case where the first kind of color is present in any of the pixels within the block, and the image processing apparatus may further include a halftone processing results synthesization unit which synthesizes a result of the first halftone processing and a result of the second halftone processing on the basis of a position of the pixel in which the first kind of color is present to obtain a result of the image processing. In this case, it is possible to simplify the processing.

(12) In the image processing apparatus, first processing of defining a bundle of rasters each of which is an arrangement of pixels arranged in one direction in the original image as a processing raster, the processing raster including at least one of the blocks handled by the second halftone unit, and second processing of generating intermediate data obtained by combining an ink amount obtained by converting gradation data of the second kind of color in units of the blocks into an ink amount of the corresponding second kind of ink, and an ink amount of the first kind of ink that corresponds to the first kind of color of each pixel or each pixel group having a smaller number of pixels than the block for each processing raster, may be performed, and the intermediate data may be processed by the first and second halftone unit so as to generate dot data that represents the presence or absence of dots to be formed that correspond to the ink amount of the first kind of ink and the second kind of ink. In the image processing apparatus, since the intermediate data obtained by combining an ink amount obtained by converting gradation data of the second kind of color in units of the blocks into an ink amount of the corresponding second kind of ink, and an ink amount of the first kind of ink that corresponds to the first kind of color of each pixel or each pixel group having a smaller number of pixels than the block are generated for each processing raster, the gradation data of the first kind of color and second kind of color of each pixel of the original image can be handled as they are, so as to reduce the amount of data.

(13) The intermediate data generated in the second halftone processing may be stored in a form encoded with the amount of ink obtained by converting gradation data of the second kind of color in units of the blocks into an ink amount of the corresponding second kind of ink and information about the number of dots to be formed in the block and a dot position in the block. In the image processing apparatus, it is possible to further reduce the data amount of the intermediate data.

(14) In the image processing apparatus, a dither mask which is larger than the block may be prepared and the encoding may be performed by encoding the comparison result of a number of threshold values corresponding to the number of pixels included in the block in threshold values included in the dither mask with the ink amount of the second kind of ink. According to the image processing apparatus, it is possible to reflect the characteristics of the dither mask into the arrangement of dots while reducing the data amount of the intermediate data.

(15) The dither mask which is larger than the block may be prepared and the encoding may be performed by combining information obtained by ranking sizes of a number of thresholds corresponding to the number of pixels included in the block in the threshold values included in the dither mask and the number of dots to be formed in the block determined on the basis of the ink amount of the second kind of ink. According to the image processing apparatus, it is possible to further reduce the data amount of the intermediate data.

(16) According to other aspects of the invention, there are provided a printing apparatus for printing an original image using a plurality of inks, an image processing method, a printing method, or a program for realizing an image processing method by a computer. The similar operational effects as in the image processing apparatus are obtained also in such inventions.

A plurality of constitutional elements included in respective embodiments of the invention are not necessarily essential elements and change, are deleted, and are exchanged with other new constitutional elements, and partial deletion of limited contents can be made for a portion of the plurality of the constitutional elements in order to solve a portion or all of the problems described above or achieve a portion or all of effects described in the specification. Further, an independent embodiment of the invention can be additionally made by combining a portion or all of technical characteristics included in an embodiment of the invention with a portion or all of technical characteristics included in other embodiments of the invention in order to solve a portion or the entirety of the problems described above or achieve a portion or the entirety of the effects described in the specification.

The invention is capable of being realized by various embodiments other than a printing apparatus or an image processing apparatus. For example, the invention can be realized with embodiments such as a manufacturing method of the image processing apparatus or the printing apparatus, a control method of the image processing apparatus or the printing apparatus, a computer program which implements the control method, or a non-transitory recording medium having recorded the computer program therein.

BRIEF DESCRIPTION OF THE DRAWINGS

The invention will be described with reference to the accompanying drawings, wherein like numbers reference like elements.

FIGS. 3A, 3B, and 3C are explanatory diagrams for explaining a block and pixels within the block in an embodiment.

FIG. 20 is an explanatory diagram illustrating coded number data as the number of large, medium, and small dots.

FIGS. 21A, 21B, 21C, and 21D are explanatory diagrams exemplifying a classification number and a sequence value matrix.

DESCRIPTION OF EXEMPLARY EMBODIMENTS (1) First Embodiment

A first embodiment of the invention will be described.

[1] Apparatus Configuration

Figure 1:
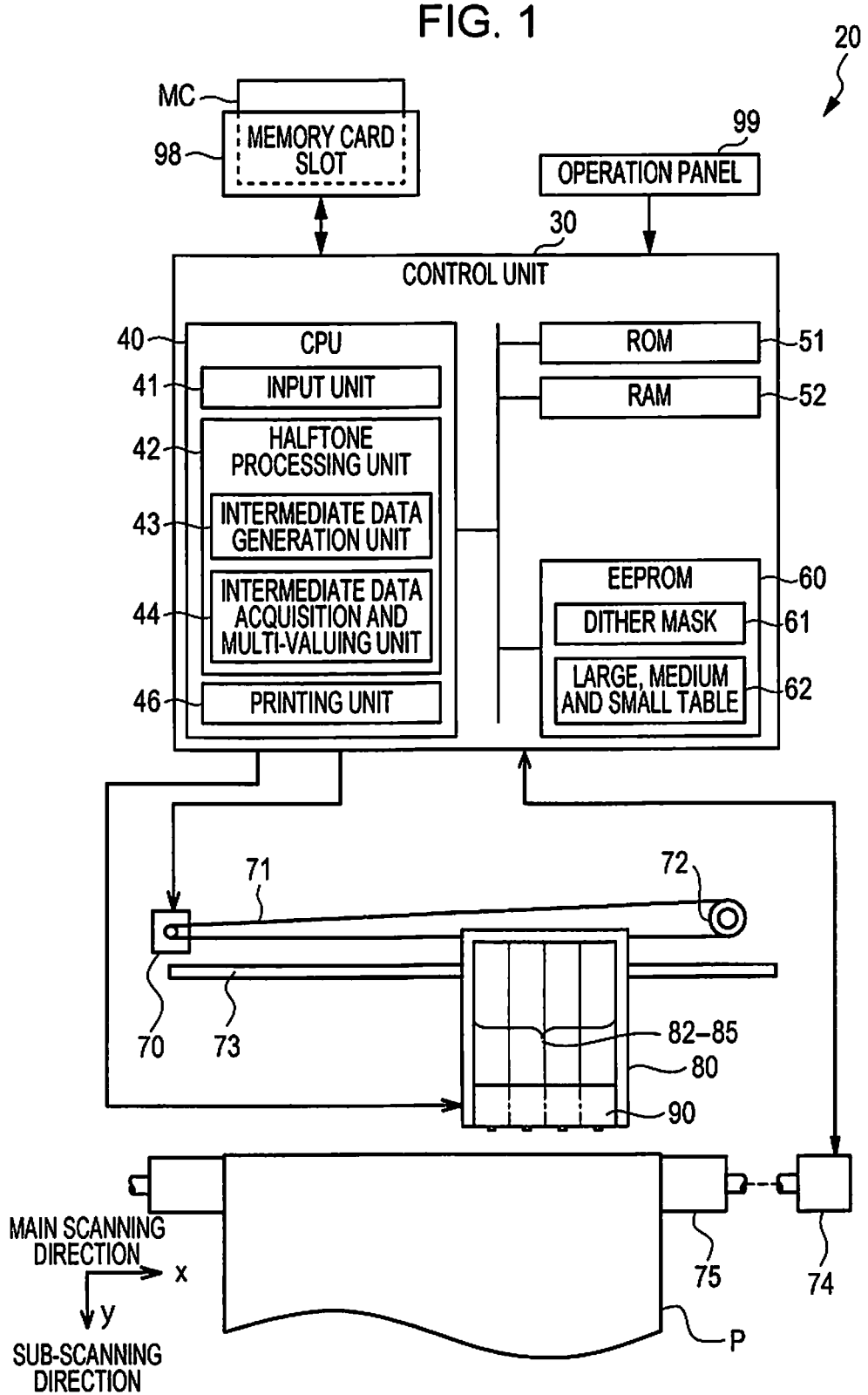
FIG. 1 is a diagram illustrating a schematic configuration of a printer as a first embodiment of the invention.

FIG. 1 is a diagram illustrating a schematic configuration of a printer 20 as a first embodiment of a printing apparatus of the invention. The printer 20 is a serial type inkjet printer configured to perform bidirectional printing and as illustrated, the printer 20 is constituted with a mechanism which transports a printing medium P by a paper feeding motor 74, a mechanism which reciprocates a carriage 80 by a carriage motor 70 in an axial direction of a platen 75, a mechanism which drives a printing head 90 mounted on the carriage 80 to eject inks and form a dot, and a control unit 30 which controls exchange of signals between the paper feeding motor 74, the carriage motor 70, the printing head 90, and an operation panel 99.

The mechanism which reciprocates the carriage 80 in an axial direction of the platen 75 is constituted with a sliding shaft 73 which is installed parallel to the axis of the platen 75 and slidably holds the carriage 80, a pulley 72 having an endless driving belt 71 stretched between the carriage motor 70 and the pulley, and the like.

The carriage 80 is provided with ink cartridges 82 to 85 for color inks that respectively accommodate cyan ink C, magenta ink M, yellow ink Y, and black ink K as color inks. A nozzle array corresponding to the color ink of each color described above is formed in the printing head 90 of a lower part of the carriage 80. When the ink cartridges 82 to 87 are installed on the carriage 80 from above, inks can be supplied from each cartridge to the printing head 90. Six color inks obtained by adding light cyan ink Lc and light magenta ink Lm to the four color inks described above may be used.

The control unit 30 is configured in such a way that a CPU 40, an ROM 51, an RAM 52, and an EEPROM 60 are connected with each other through a bus. The control unit 30 controls the entire operation of the printer 20 and also functions as an input unit 41, a halftone processing unit 42, and a printing unit 46 by developing a program stored in the ROM 51 or the EEPROM 60 in the RAM 52 and executing the program. The function of the halftone processing unit 42 includes functions as an intermediate data generation unit 43 and an intermediate data acquisition and multi-valuing unit 44 that correspond to a subordinate concept to a first and second halftone processing units. A dither mask 61 and a large, medium, and small table 62 are stored in the EEPROM 60. Halftone processing and the dither mask 61 used for the halftone processing will be described in detail later. The large, medium, and small table 62 is not used in the first embodiment particularly but used in second to fourth embodiments, and thus is illustrated as being included in the EEPROM 60. The contents of the table will be described in detail in the second embodiment. In a case where a method other than a dithering method, for example, an error diffusion method is used in the halftone processing, the dither mask 61 may not be provided. Similarly, in a case where only binarization is performed regarding multi-valuing, the large, medium, and small table 62 may not be provided.

The control unit 30 is connected with a memory card slot 98 and can read image data ORG from a memory card MC inserted in the memory card slot 98 and receives the image data as an input. In the first embodiment, the image data ORG input from the memory card MC is data constituted with color components of three colors of red (R), green (G), and blue (B).

The printer 20 having the hardware configuration as described above reciprocates the printing head 90 in the main scanning direction with respect to the printing medium P by driving the carriage motor 70 and moves the printing medium P in the sub-scanning direction by driving the paper feeding motor 74. The control unit 30 drives the nozzle at an appropriate timing on the basis of printing data in accordance with movement (main scanning) that the carriage 80 reciprocates and movement (sub-scanning) of the printing medium so as to form ink dots of appropriate color on an appropriate position on the printing medium P. By doing this, the printer 20 can print the color image input from the memory card MC on the printing medium P.

[2] Printing Process

Figure 2:
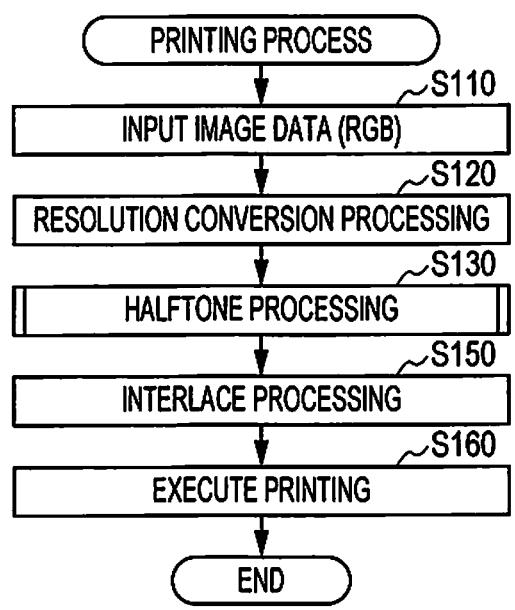
FIG. 2 is a flowchart illustrating a flow of a printing process in the printer.

A printing process in the printer 20 will be described. FIG. 2 is a flowchart illustrating a flow of a printing process in the printer 20. The printing process is initiated when a user performs a printing instruction operation for a predetermined image stored in the memory card MC using the operation panel 99 or the like. When the printing process is initiated, the CPU 40, as processing of the input unit 41, reads the image data ORG having an RGB format which is a target to be printed from the memory card MC through the memory card slot 98 and receives the image data as an input (Step S110). The image data ORG is data stored in the JPEG or PNG format but, the data format is not limited.

When the image data ORG is received as an input, the CPU 40 performs resolution conversion (Step S120). The resolution conversion is the processing of converting the resolution of the image data ORG in accordance with the resolution of the printer 20. In a case where the image data resolution and the printer resolution are the same, the resolution conversion may not be performed.

When the resolution conversion processing is performed, the CPU 40, as the processing of the halftone processing unit 42, performs the halftone processing which converts the image data into dot data obtained by determining ON/OFF of a dot of each color for each pixels (Step S130). Details of the halftone processing will be described later. In the specification, the "halftone processing" is not limited to the binarization processing of ON/OFF of the dot, and means general gradation number conversion (reduction) processing including the multi-valuing processing such as ON/OFF of a large dot and a small dot, and the like. The image data to be provided in Step S130 may be data subjected to image processing such as smoothing processing or the like.

When the halftone processing is performed, the CPU 40 performs interlace processing which rearranges a dot array subjected to the halftone processing in dot pattern data to be formed in unit of one time main scanning in accordance with a nozzle arrangement or a paper feeding amount, or the like, of the printer 20 (Step S150). When the interlace processing is performed, the CPU 40 executes, as the processing of the printing unit 46, printing by driving the printing head 90, the carriage motor 70, the paper feeding motor 74, and the like (Step S160).

[3] Outline of Halftone Processing

The halftone processing described above (Step S130) will be described with reference to from FIGS. 3A to 3C in the drawings. Prior to the description of the halftone processing, a concept of block in the first embodiment will be described. In the halftone processing to be described below, 2×2 pixels are set as a single block and processing is performed in unit of a block. FIGS. 3A to 3C is an explanatory diagram illustrating a relationship between the block and pixels. FIG. 3A illustrates a relationship between a block position (Bny, Bnx) and a pixel position (y, x). When an upper left pixel of each block is taken as an example, the relationship between a block number and the pixel position is represented as follows.

$$y=2 \cdot Bny$$

$$x=2 \cdot Bnx$$

FIG. 3B illustrates a processing sequence of 2×2 pixels included in a single block. The processing is performed in order of the upper left pixel (PT=1), the upper right pixel (PT=2), the lower left pixel (PT=3), and the lower right pixel (PT=4) within the block. In the following description, the pixel is specified by a reference numeral PT but, correspondence between the pixel and an actual pixel position is set as illustrated in FIG. 3C. That is, $$PT=1: (y,x)=(2 \cdot Bny, 2 \cdot Bnx)$$

$$PT=2: (y,x+1)=(2 \cdot Bny, 2 \cdot Bnx+1)$$

$$PT=3: (y+1,x)=(2 \cdot Bny+1, 2 \cdot Bnx)$$

$$PT=4: (y+1,x+1)=(2 \cdot Bny+1, 2 \cdot Bnx+1)$$

Figure 4:
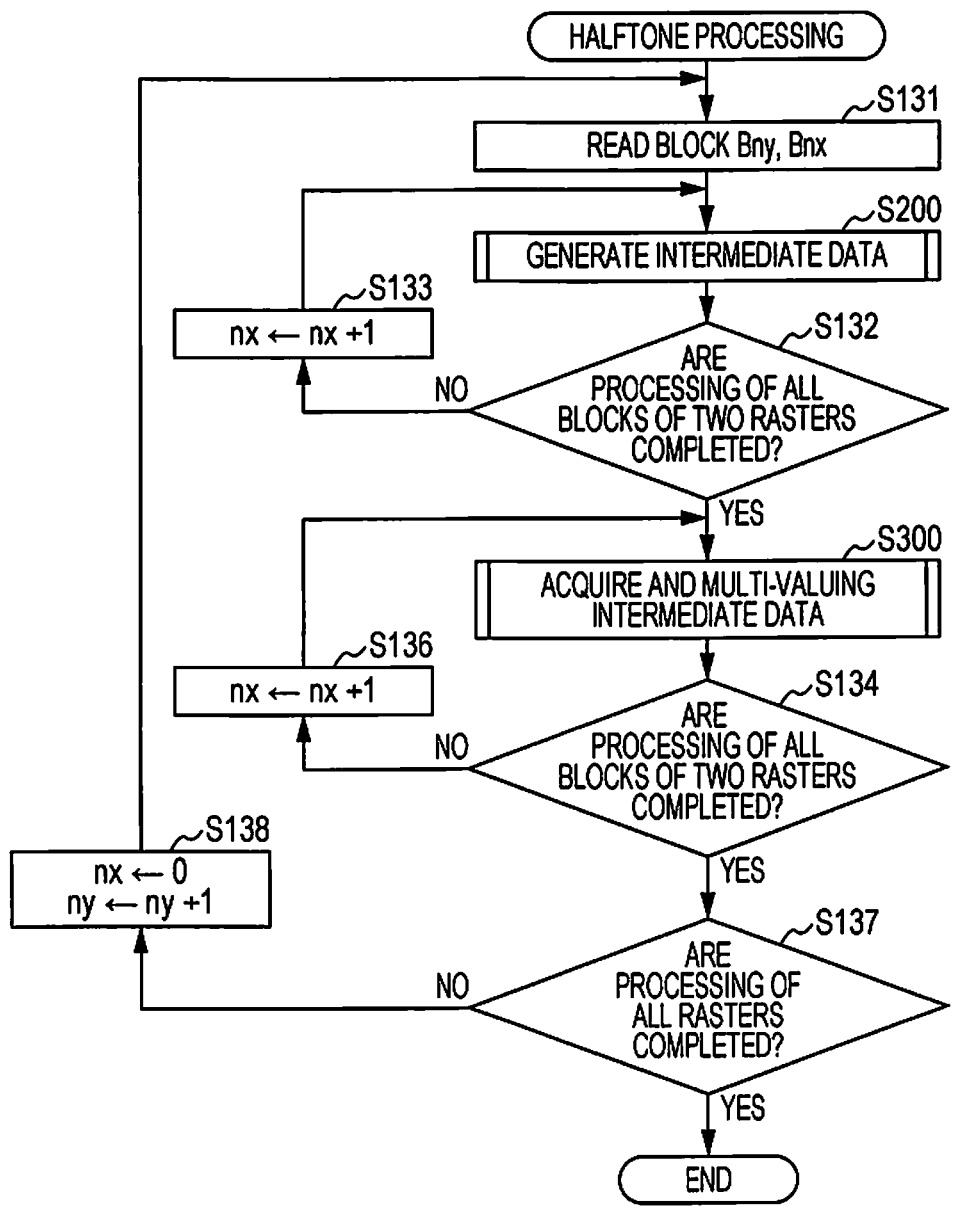
FIG. 4 is a flowchart illustrating a flow of halftone processing as the first embodiment.

FIG. 4 is a flowchart illustrating an outline of the halftone processing in the first embodiment. The halftone processing is initiated by taking the image upper left corner as the starting point (x=0, y=0). In the first embodiment, when a position of the block to be processed is sequentially incremented from the upper left block (0, 0) of an image in the main scanning direction (x-direction) and incrementing of the position of the block is performed up to the right end in the main scanning direction, the position in the sub-scanning direction (y-direction) is incremented and the incrementing of the position of the block is sequentially performed again from the left end. An arrangement of pixels having the same position in the sub-scanning direction is referred to as a "raster". The processing is performed in unit of a block and thus, the halftone processing in the first embodiment is performed by two rasters. When the processing for an arrangement of a single block (two rasters) is completed, the processing is shifted for processing an arrangement of next block (two rasters). For this reason, in the following description, the position of pixel and the position of block being processed are represented in order of (y, x). In the following descriptions, the position of pixel is represented using the block number Bn. Both of a starting position of a block (0, 0) and a starting position of a pixel (0, 0) are the upper left of a certain image, differently from the normal coordinate representation.

When the halftone processing illustrated in FIG. 4 is initiated, processing of reading image data of the block position (Bny, Bnx) is performed first (Step S131). The read image data is the image data ORG before the image conversion. Specifically, the read image data is RGB data of each of four pixels of the block position (Bny, Bnx). The RGB data of each pixel is represented by R[PT] G[PT] B[PT]. When it is intended to represent each color of each pixel using 8-bit, each color of each pixel is represented by 8-bit×3 colors×4 pixels=96-bit data. Although various colors can be represented by a combination of RGB colors, in the first embodiment, processing is performed on a special color and a normal color by making a distinction between the colors. Meanings of the special color and the normal color will be described.

[4] Details of Halftone Processing

In the first embodiment, one or more colors of colors of an original image are handled as a special color. In the first embodiment, a black color is handled as a special color and colors other than the black color are handled as a normal color. The special color corresponds to a concept subordinate to a first kind of color in the invention and the normal color corresponds to a concept subordinate to a second kind of color in the invention. Determination as to what color is to be the special color can be arbitrarily determined depending on an object of the halftone processing. In the first embodiment, since the object is to reproduce a black color with a high image quality, the black color is set as the special color and other colors other than the black color is set as the normal color but, it is not limited, even when a black color and a red color are set as the special color. Otherwise, other colors or a combination thereof may be handled as the special color. Determination as to whether or not it is the special color may be performed by determining whether or not an RGB value is included in a particular range determined in advance. In the first embodiment, in a case where an RGB value is R=G=B=0, the color having the RGB value is handled as the special color (black color).

Figure 5:
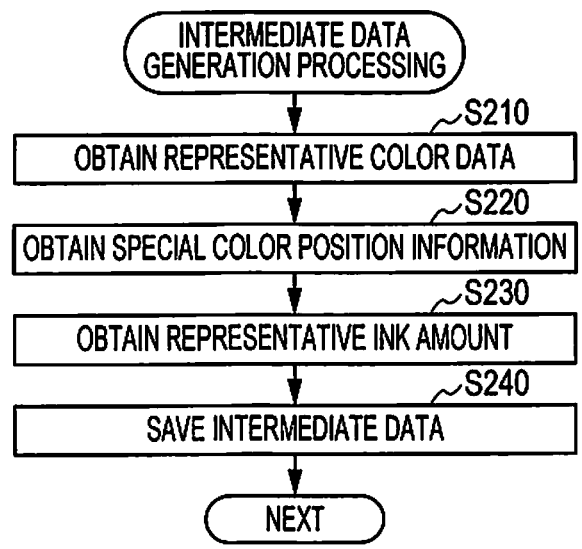
FIG. 5 is a flowchart illustrating a flow of intermediate data generation processing which is executed in the halftone processing of the first embodiment.

The processing of generating intermediate data by analyzing the data of four pixels of the block position (Bny, Bnx) that are read in Step S132 (Step S200). Details of the intermediate data generation processing are illustrated in FIG. 5. In the intermediate data generation processing, a representative color is obtained first (Step S210). When the representative color is obtained, it corresponds to obtaining data that represents the normal color and obtaining data RmGmBm of an average value of respective values of the RGB data of a pixel except for the special color (R=G=B=0).

$Rm=(\Sigma R[PT])/4 PT=1,2,3,4$ $Gm=(\Sigma G[PT])/4 PT=1,2,3,4$ $Bm=(\Sigma B[PT])/4 PT=1,2,3,4$ Initially, when any of the pixels PT is the special color, the pixel is excluded from the above arithmetic expression. However, the special color in the first embodiment is the black color (R=G=B=0) and thus, it does not matter it is not limited that the arithmetic expression is performed for all the pixels PT.

Next, the processing of obtaining position information of the special color is performed (Step S220). Specifically, it is checked if a pixel of black color is present for four pixels PTs (PT=1, 2, 3, 4) within the block position (Bny, Bnx). In a case where the black color pixel is present, the position is set as black color pixel position information and is stored in a variable BKp (1-bit is allocated for each pixel and a variable of 4-bits in four pixels) which is prepared in advance. An initial value of BKp is set as to 0 (all bits are 0) and the bit corresponding to the pixel position at which the special color (black color) pixel is present is set to 1. That is, the following processing is performed.

Initial value: BKp=0
If an upper left pixel (PT=1) is a black color pixel, BKp=BKp+1//bit 0 is set
If an upper right pixel (PT=2) is a black color pixel, BKp=BKp+2//bit 1 is set
If a lower left pixel (PT=3) is a black color pixel, BKp=BKp+4//bit 2 is set
If a lower right pixel (PT=4) is a black color pixel, BKp=BKp+8//bit 3 is set In the special color position information BKp of 4-bits, bit 0 corresponds to the upper left pixel (PT=1) within the block and bit 3 corresponds to the lower right pixel (PT=4) within the block, and constitutes the intermediate data to be described later.

Next, the processing of acquiring a representative ink amount is performed (Step S230). The representative ink amount is a CMYK ink amount obtained by performing color conversion on representative color data. The representative color data RmGmBm is converted into the CMYK ink amount using 3D-LUT which is prepared in advance. If the 3D-LUT maintains lattice points having 8-bit of the respective colors, that is, 255×255×255, the representative color data can be converted into the representative ink amount by referring to the 3D-LUT. However, in a case where the LUT having 5-bits of the respective colors, that is, about 32×32×32 lattice points, the representative color data that is not present in the lattice points is converted into the representative ink amounts of corresponding four colors using tetrahedron interpolating operation. As a result, 8-bit for each of CMYK, that is, a total of 32 bits=8-bit×4 colors of the representative color ink amount CmMmYmKm is obtained for each of CMYK.

Figure 6:
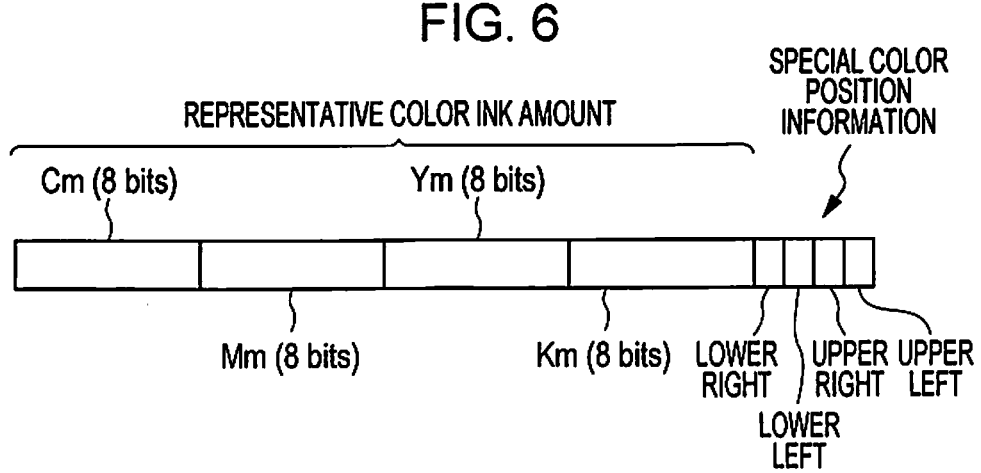
FIG. 6 is an explanatory diagram illustrating a structure of intermediate data.
Figure 7:
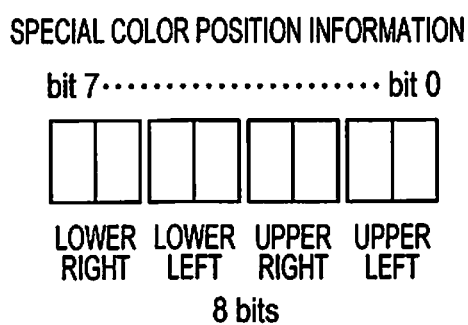
FIG. 7 is an explanatory diagram illustrating other configuration example of special color position information.

The representative color ink amount CmMmYmK obtained by doing as described above is handled as a portion of the intermediate data. A data structure of the intermediate data is illustrated in FIG. 6. As illustrated, the intermediate data is constituted with a representative ink amount CmMmYmKm (8-bit×4 colors) and special color position information BKp of 4-bit obtained in Step S220. In the first embodiment, the special color position information is set as information of 1-bit of each pixel but, may be set as information of 2-bit of each pixel. In this case, it may correspond to the information of 2-bit of each pixel_by sequentially allocating by 2 bits from the lower bit in the right direction by setting the upper left pixel as a starting point like the upper left pixel (PT=1) of bit 0 and bit 1, the upper right pixel (PT=2) of 2 and bit 3, the lower left pixel (PT=3) of bit 4 and bit 5, and the lower right pixel (PT=4) of bit 6 and bit 7. This example is illustrated in FIG. 7.

Figure 8:
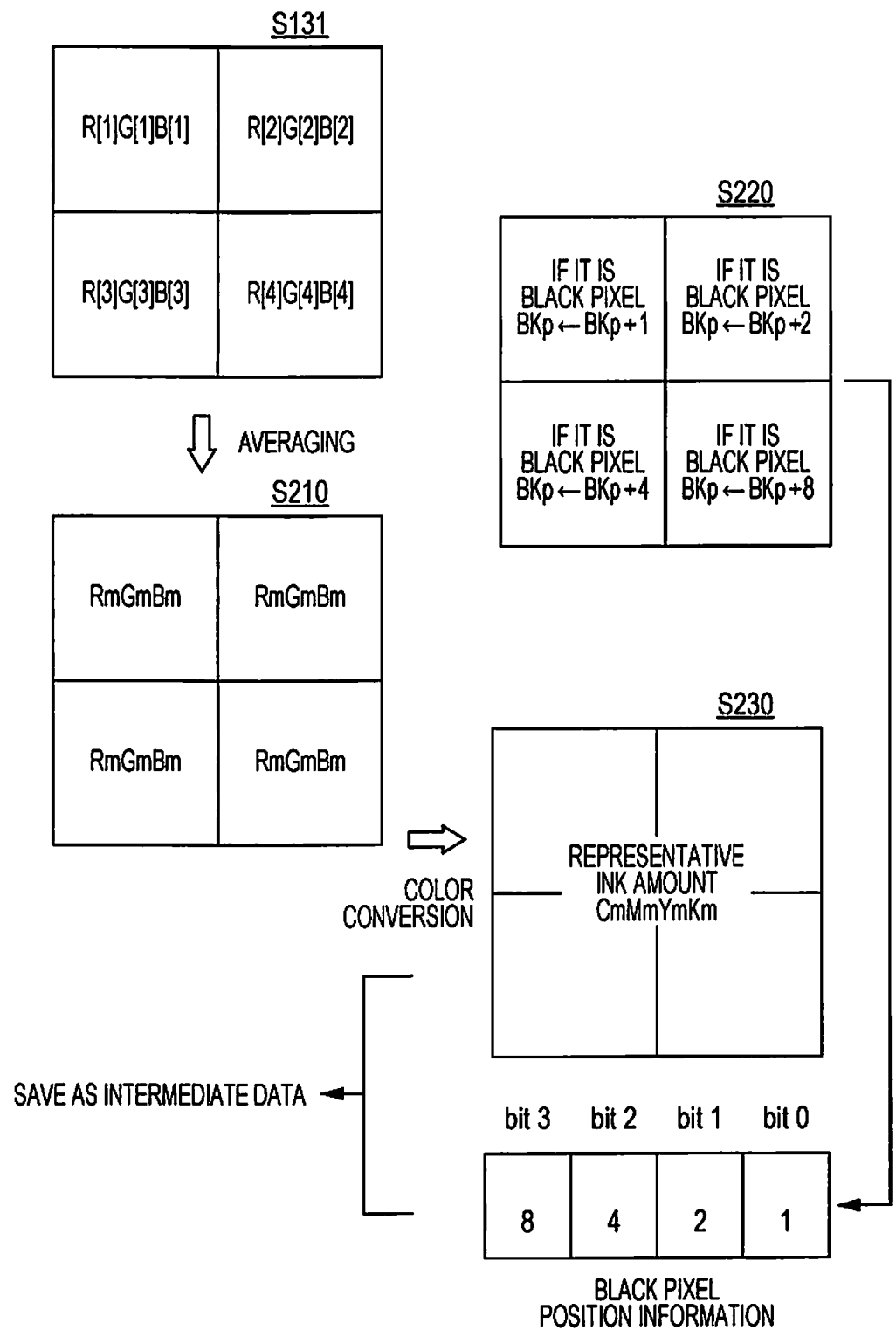
FIG. 8 is an explanatory diagram exemplifying a state of intermediate data generation.

The intermediate data generation processing for a single block as described above is illustrated in FIG. 8. In the upper left of FIG. 8, each of four pixels of within single block has the RGB image data, and the upper left of FIG. 8 corresponds to the processing of reading the RGB image data (Step S132). The representative color data RmGmBm is obtained by averaging the RGB data of each pixel (Step S210). It is checked if a pixel of black color is present within the block, and when the black color pixel is present, the corresponding bit of the special color position information BKp is set to 1 (Step S220).

In such a case, both the special color position information BKp and the representative ink amount obtained by performing color conversion (Step S230) on the representative color data RmGmBm are saved as the intermediate data (Step S240). In this processing, since the normal color is handled as the block (average value) formed by collecting four pixels, the amount of data to be processed is reduced. On the other hand, for the special color, only the pixel position is gradually reduced by a few to information of four bits.

The intermediate data obtained as described above is saved in a predetermined area of the RAM 52 (Step S240). When the intermediate data is generated for a single block, it is determined whether or not the processing is completed for all the blocks of two rasters (Step S132). When the processing is not completed for all the blocks, the block number nx is incremented by 1 (Step S133), that is, it is moved by one block in the x-direction and the intermediate data generation processing is repeated.

Figure 9:
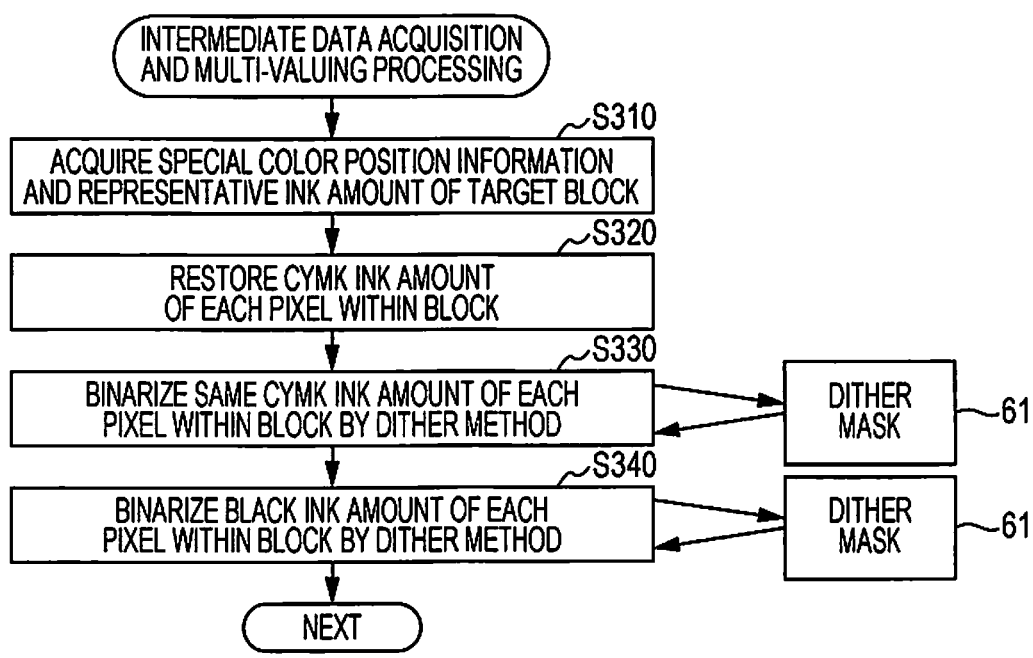
FIG. 9 is a flowchart illustrating a flow of intermediate data acquisition and multi-valuing processing which is executed in the halftone processing of the first embodiment.

In this way, when the intermediate data generation processing is completed for all the blocks of two raster, the intermediate data acquisition and multi-valuing processing is performed (Step S300). Details of the intermediate data acquisition and multi-valuing processing are illustrated in FIG. 9. The multi-valuing processing is the binarization processing in actuality, however, it is also referred to as "multi-valuing" in the first embodiment by prioritizing similarities to other embodiments. When the intermediate data acquisition and multi-valuing processing is initiated, first, the following processing is performed for each block from first positions of all the blocks of two rasters, that is, the block (0, 0).

1. Step S310: The processing of acquiring the special color position information BKp and the representative ink amount CmMmYmKm of a target block
2. Step S320: The processing of restoring an amount of CMYK ink of each pixel within a block
3. Step S330: The processing of binarizing the same amount of CMYK ink of each pixel within a block by a dither method
4. Step S340: The processing of binarizing the amount of a black ink of each pixel within a block by a dither method In the following, the processing described above will be described with reference to FIG. 10. First, in Step S310, the special color position information BKp and the representative ink amount CmMmYmKm of a target block are acquired. This data is saved in a predetermined area of the RAM 52 in the previous intermediate data generation processing (Step S200). In the example illustrated in FIG. 10, the representative ink amount CmMmYmKm is Cm=68, Mm=95, Ym=41, and Km=64. For the special color position information BKp, bit 2=1, that is, the lower left portion within the block is set as the black color pixel.

In Step S320, an amount of CMYK ink of each pixel is restored from the representative ink amount CmMmYmKm and the special color position information BKp. The restoration is performed by setting the representative ink amount data CmMmYmKm to the pixel which is not set as the black color pixel and setting an ink amount CkMkYkKk for black color pixel prepared as the amount of special color ink to the pixel which is set as the black color pixel. Details of the restoration are as follows.

Figures 11A, 11B:
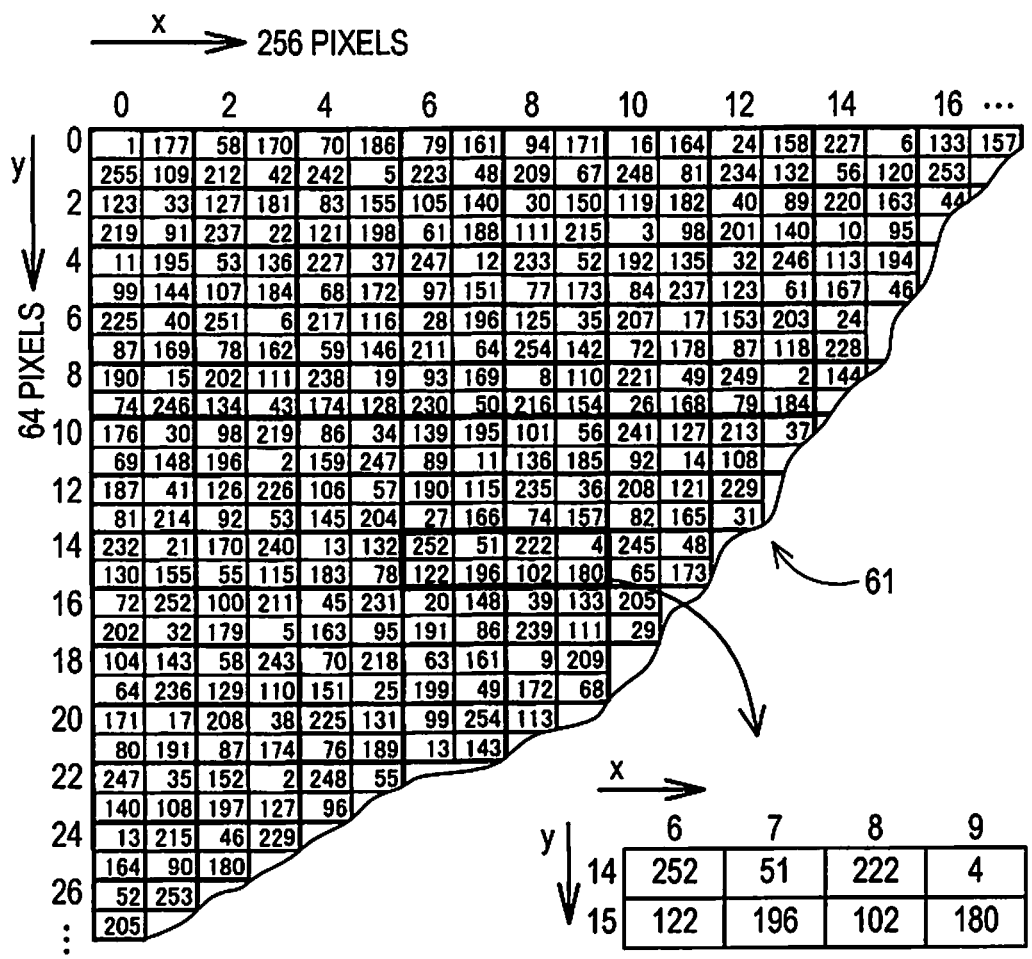
FIGS. 11A and 11B are explanatory diagrams illustrating a dither mask used in an embodiment.

Upper Left Pixel Data (PT=1)
If bit 0 of the BKp is 1, C00=Ck, M00=Mk, Y00=Yk, K00=Kk
If bit 0 of the BKp is 0, C00=Cm, M00=Mm, Y00=Ym, K00=Km Upper Right Pixel Data (PT=2)
If bit 1 of the BKp is 1, C01=Ck, M01=Mk, Y01=Yk, K01=Kk
If bit 1 of the BKp is 0, C01=Cm, M01=Mm, Y01=Ym, K01=Km Lower Left Pixel Data (PT=3)
If bit 2 of the BKp is 1, C10=Ck, M10=Mk, Y10=Yk, K10=Kk
If bit 2 of the BKp is 0, C10=Cm, M10=Mm, Y10=Ym, K10=Km
Lower Right Pixel Data (PT=4)
If bit 3 of the BKp is 1, C11=Ck, M11=Mk, Y11=Yk, K11=Kk
If bit 3 of the BKp is 0, C11=Cm, M11=Mm, Y11=Ym, K11=Km Subsequently, in Step S330, binarization is performed by a dither method using the CMYK ink amount which is set in Step S320. Since the amounts of CMYK inks of all the pixels other than the black color pixel are the same, the binarization by the dither method can be performed by taking out 2×2 threshold values from the dither mask 61 and comparing the threshold value with the amount of CMYK ink. An example of such a dither mask 61 is illustrated in FIGS. 11A and 11B. The dither mask 61 has a size of 256 pixels in the x-direction by 64 pixels in the y-direction, and threshold values of 1 to 255 are respectively stored in the respective positions. Some of the threshold values of the dither mask 61 are enlarged and illustrated in FIG. 11B. The threshold values are arranged such that the dot arrangement obtained by comparing the threshold value and the ink amount of pixel represents blue noise characteristics.

For the pixels for which it is determined that the black color pixel is not present by referring to the special color position information BKp, it is determined whether or not the dot of each ink color of each pixel is to be formed by comparing the amount of CMYK ink of the pixel with the threshold value of the dither mask. The threshold values are read from the dither mask 61 while moving threshold value reading positions from the dither mask 61 in accordance with the block position (Bny, Bnx). The reading position can be determined by the remainder resulting from the division of a pixel size by the size of the dither mask 61. In a case where the determination is made for each color, when referring to the same 2×2 threshold values of the same dither mask 61 for each ink, it becomes easy for the dot to be formed on the same pixel regardless of the ink color. Therefore, in a case where the same dither mask 61 is used, a place where 2×2 thresholds values are taken out for each ink color is preferably shifted. Otherwise, different dither mask 61 may be used for each ink color. Since all the amounts of CMYK inks are the same in the pixels other than the black color pixel, the comparison of the amount of CMYK ink with 2×2 threshold values may be performed at one time. In the lower right section of FIG. 10, an example of the result of the determination as to whether or not the dot is to be formed is obtained by comparing the 2×2 thresholds values with each of the amounts of CMYK ink.

The binarization processing (Step S340) of the amount of black ink which is subsequently performed to the determination for the amount of CMYK ink is similar to the processing in Step S360 but, the ink amount K of the black color which becomes a target is set to Kk for the black color pixel and is set to Km for the pixels other than the black color pixel. Regarding the black color, since there is a high possibility that the values of the ink amount are different for each pixel, the determination is performed for each pixel. The dither mask 61 to be used may be the same as or different from the dither mask for other colors. Further, the positions for reading may not be shifted.

By the processing as described above, the intermediate data acquisition and multi-valuing processing for a single block is completed. When the intermediate data acquisition and multi-valuing processing for a single block is completed, it is determined whether or not the processing for all the blocks of two rasters is completed (Step S134). When the processing for all the blocks is not completed, the block number nx is incremented by 1 (Step S136), that is, moved by 1 block in the x-direction, and repeats the intermediate data acquisition and multi-valuing processing.

When the processing for all the blocks each of consisting of two rasters is completed (Step S134: YES), next, it is determined whether or not the processing for all the raster is completed (Step S137). When the processing for all the raster is not completed, the block position within two rasters is initialized (nx←0), the position is moved by two rasters in the y-direction (ny←ny+1), and the intermediate data generation processing (Step S200) and the intermediate data acquisition and multi-valuing processing (Step S300) are repeated (Step S138). When the processing for all the raster is completed (Step S137: YES), "END" is encountered, and the processing ends.

As previously described using FIG. 2, the interlace processing (Step S150) is performed after the halftone processing described above, and thereafter, the printing is executed (Step S160).

In the printer 20 of the first embodiment described above, different halftone processing can be applied to the black color set as the special color and the normal color other than the black color. The halftone processing is performed for each pixel, especially, for the black color, and performed in unit of the block for the normal color. In this way, regarding the color for which the processing with high image quality is required, such as characters or contour lines, a high image quality is achieved by the processing in unit of pixel that are frequently represented by a black color, while the halftone processing is performed by using the average value of 2×2 pixels for the normal color. Therefore, the processing can be simplified and the high-speed processing can be realized. According to the first embodiment, since a portion of the intermediate data is generated in unit of the block in the intermediate data generation processing, an effect that the capacity of the intermediate data after the color conversion can be reduced compared to that in the related art can be achieved.

In the first embodiment, whether or not the dot is to be formed for the black color which is the special color and the normal color is made by the comparison with the threshold value of the dither mask 61 using the dither method in the halftone processing. Therefore, the processing can be simplified and the higher-speed processing can be realized its entirety compared to the error diffusion method. The error diffusion method may be adopted for the black color to increase reproducibility of a thin line or the like. Otherwise, the error diffusion method may be adopted for the normal color to achieve both an advantage of the error diffusion method and the high-speed processing in unit of the block.

[5] Modified Example of First Embodiment

<1> In the first embodiment, although only the black color is handled as the special color, other colors, for example, a red color may be handled as the special color. Otherwise, a plurality of colors such as black and red, or black and green, may be handled as the special color. The special color does not need to be the primary colors as described above and a specific color range may be handled as the special color. For example, it is not limited and the specific color range defined as the skin color is handled as the special color.

Figure 10:
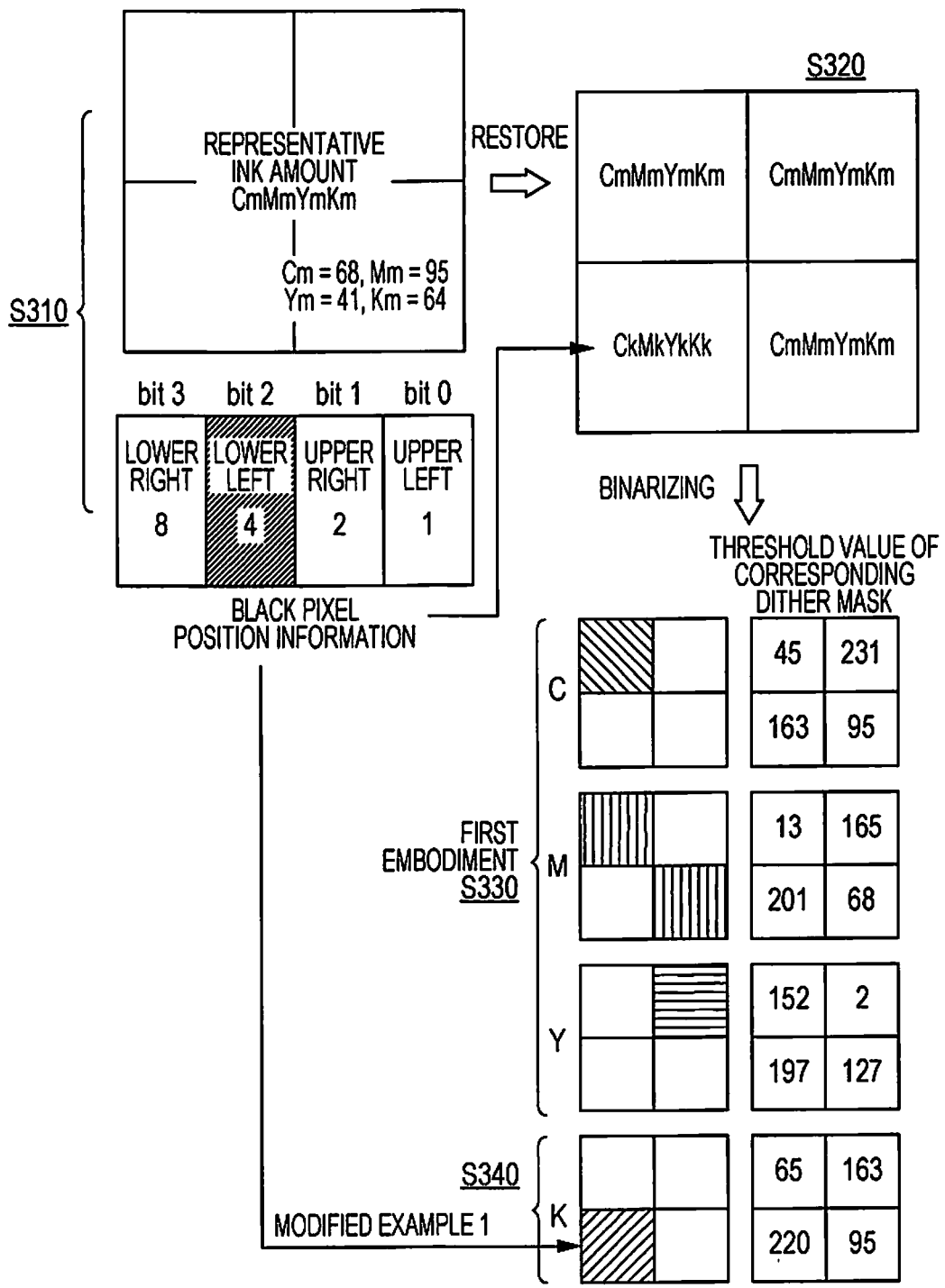
FIG. 10 is an explanatory diagram illustrating a state of restoration of the intermediate data in the first embodiment and a modified example thereof.

<2> In the first embodiment, although the pixel of black color which is the specific color is subjected to the halftone processing by applying the dither method, as illustrated in the lower most section of FIG. 10, it may be determined that the dot of the black ink is to be formed on the pixel to which the special color position information BKp is set. This is because the color of the corresponding pixel in the original image is not black (R=G=B=0), and thus it can be determined that there is no problem, even when the black dot is formed. In this way, it is not necessary to perform the determination processing with the threshold value in the dither method.

<3> In the first embodiment, although the pixels that belong to a single block are 4 pixels consisting of 2×2 pixels, the pixels may be 8 pixels consisting of 2×4 pixels. In this case, although the special color position information needs eight pixels, that is, 8 bits are needed, the representative ink amount is representative of the amount of 8 pixels and thus, the capacity for the intermediate data can be reduced.

<4> In the first embodiment, although the intermediate data is generated, stored and restored in a single printer 20, a printer drive side installed in a computer may perform generation of the intermediate data, transfer the generated intermediate data to the printer 20, and perform the multi-valuing of the intermediate data. In this case, the data amount of the intermediate data can be reduced compared to data of the original image or data after the multi-valuing, and can contribute to reduction of a transfer time or the like.

<5> In the first embodiment, since the intermediate data generation processing (Step S200) is performed for all the blocks that belong to two rasters, the intermediate data acquisition and multi-valuing processing (Step S300) is performed. In contrast, it is also possible to adopt a configuration in which the intermediate data generation processing and the intermediate data acquisition and multi-valuing processing are continuously performed for one block. In the first embodiment, the dither method is used and data is not exchanged between the blocks and thus, it is possible to adopt the configuration. On the other hand, since the intermediate data acquisition and multi-valuing processing is started at the time when the intermediate data generation processing for all the blocks that belong to two rasters is completed, the error diffusion between the blocks is easily performed at least in the x-direction.

(2) Second Embodiment

Next, a second embodiment of the invention will be described. The second embodiment is different from the first embodiment in that the multi-valuing processing other than the binarization processing (specifically, 4-ary valuing) is not performed in the intermediate data acquisition and multi-valuing processing (Step S300) in the halftone processing. Other processing are generally the same as those of the first embodiment. The result obtained by performing 4-ary valuing is reproduced by three types of dots of large, medium, and small on the printing medium P by the printing head 90. The printing head 90 can represent each pixel with four gradations of "large dot", "medium dot", "small dot", and "dot none".

Figure 12:
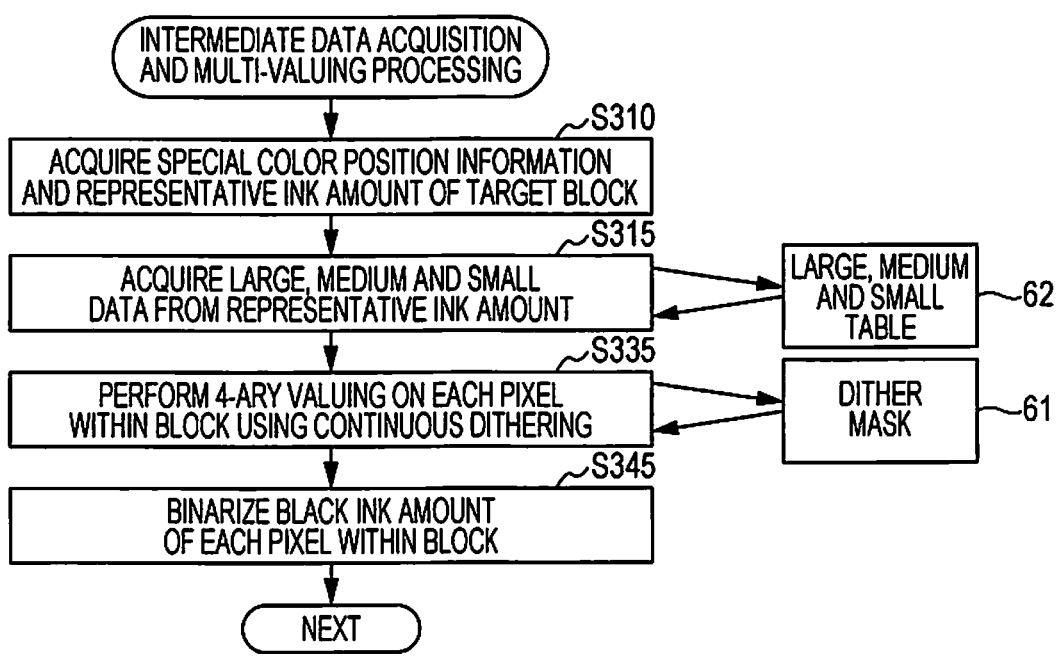
FIG. 12 is a flowchart illustrating a flow of intermediate data acquisition and multi-valuing processing in a second embodiment.
Figure 13:
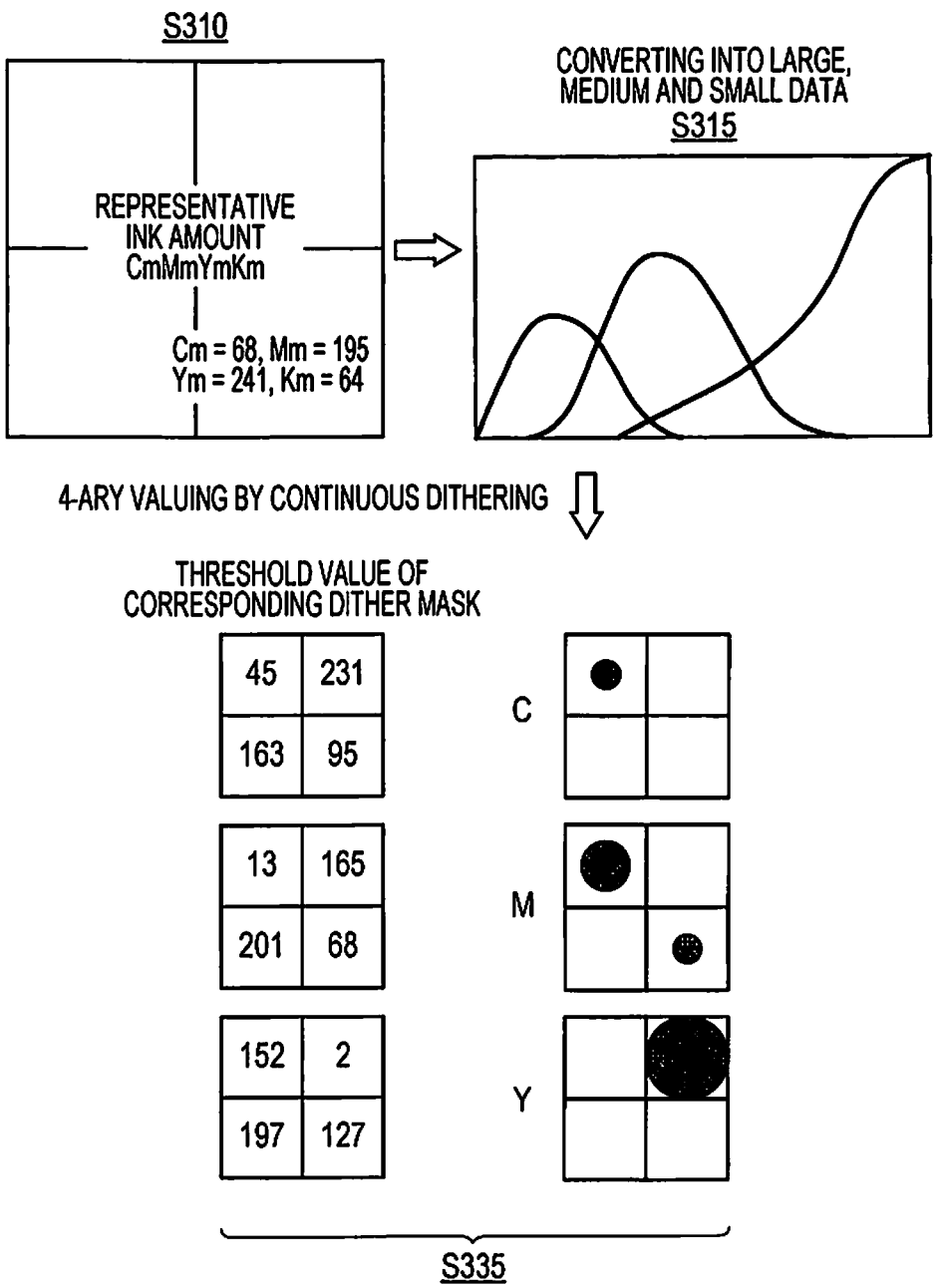
FIG. 13 is an explanatory diagram for explaining a state of restoration of the intermediate data in the second embodiment.

In the second embodiment, the printing process (FIG. 2) and the halftone processing (FIGS. 3A to 3C) are performed, similar to the first embodiment. In the halftone processing, the intermediate data generation processing (Step S200) is performed and then, the intermediate data acquisition and multi-valuing processing is performed, similar to the first embodiment. In the second embodiment, processing illustrated in FIG. 12 is performed as the intermediate data acquisition and multi-valuing processing. When the processing is initiated, the processing of acquiring a representative ink amount and special color position information of a target block is performed similar to the first embodiment (Step S310). Here, the acquired representative ink amount and special color position information are the ink amount and information (see FIG. 8 and FIG. 10) obtained by the intermediate data generation processing (FIG. 5) described in the first embodiment. Now, a flow of the halftone processing according to the processing of FIG. 12 is exemplified in FIG. 13. In the following, the flow will be described with reference to FIG. 12 and FIG. 13.

Figure 14:
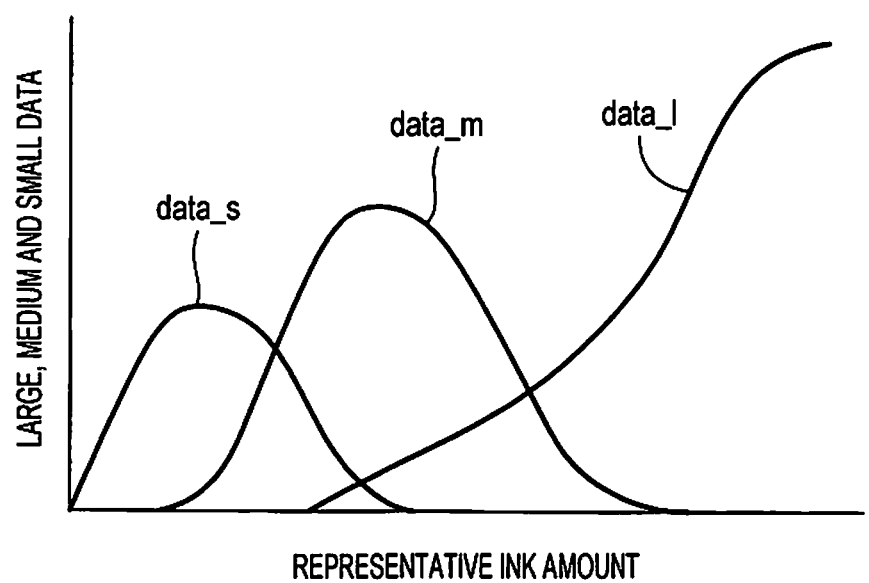
FIG. 14 is an explanatory diagram for conceptually illustrating an example of a large, medium, and small table in the second embodiment.

When the representative ink amount and the special color position information are acquired, next, the representative ink amount is converted into the large, medium, and small data (Step S315) by referring to the large, medium, and small table 62. The large, medium, and small data are data represented as a ratio which is required to realize the representative ink amount by each of large, medium, and small dots. An example of the large, medium, and small table 62 is illustrated in FIG. 14. In FIG. 14, although the table is illustrated as a table in which the same large, medium, and small data are given to each of the representative ink amount CmMmYmKm, the table may be different for each color. In FIG. 14, a relationship between the representative ink amount Cm and the large, medium, and small data is illustrated by taking cyan ink as an example.

As illustrated in FIG. 14, only the small dot is formed in the vicinity of a point at which the representative ink amount Cm is 0 and a ratio of small dots to be formed increases as the representative ink amount Cm increases. Here, the ratio of formed dots refers to a percentage (100×Nd/Ng) of the number of dots Nd to be formed on a predetermined number Ng of printing pixels in a case where the same representative ink amount Cm is succeeded, that is, in a case of being filled with the same color. When the representative ink amount Cm reaches a first gradation value which is a predetermined gradation value, the medium dots start to form and gradually increase, and the ratio of formed small dots is reduced in accordance with the gradual increase in the medium dots. Similarly, when the representative ink amount Cm reaches a second gradation value larger than the first gradation value, the large dots start to form and gradually increase, and the ratio of formed medium dots is reduced in accordance with the gradual increase in the medium dots. The ratio of formed small dots is represented by data_s, the ratio of formed medium dots is represented by data_m, and the ratio of formed large dots is represented by data_l, and a value obtained by adding all the values of these ratios is represented by data_t. A relationship that indicates the ratio of small, medium, and large dots to the representative ink amount Cm is stored in an EEPROM 60 as the large, medium, and small table 62.

In Step S315, the large, medium, and small table which is stored in the EEPROM is referred to on the basis of the representative ink amount and data data_s, data_m, and data_l that represent the ratio of formed small, medium, and large dots are acquired. Subsequently, processing of performing 4-ary valuing on each pixel within the block using continuous dithering is performed (Step S335).

The 4-ary valuing processing using continuous dithering is performed as follows.

(A) For a single pixel included in a single block, the CPU 40 determines whether the data_l that represents the ratio of formed large dots is greater than or equal to a threshold value THn_d of a corresponding position of the dither mask 61. When the data_l is greater than or equal to the threshold value THn_d, the CPU 40 inputs a value of 3 ("11" in binary number) that represents the large dots are to be formed into a result value Result [PT] of the pixel PT.

(B) On the other hand, when the data_l is less than the threshold value THn_d, the CPU 40 determines whether a total value of the data_l and the data_m is greater than or equal to the same threshold value THn_d. When the data_l plus the data_m is greater than or equal to the THn_d, the CPU 40 inputs a value of 2 ("10" in binary number) that represents the formed medium dots into a result value Result [PT] of the pixel PT.

(C) Also, when the data_l plus the data_m is less than the threshold value THn_d, the CPU 40 determines whether a total value data_t is greater than or equal to the same threshold value THn_d. When the data_t is greater than or equal to the THn_d, the CPU 40 inputs a value of 1 ("01" in binary digit) that represents the small dots to be formed into a result value Result [PT] of the pixel PT.

(D) When any of the results of the determinations described above is "NO", the CPU 40 inputs a value of 0 ("00" in binary number) that represents any of the large, medium, and small dots are not to be formed into a result value Result [PT] of the pixel PT.

(E) The processing as described above are executed by changing pixel positions and the thresholds values, that is, are sequentially performed from PT=1 to PT=4. By the processing, all of four Result [1] to Result [4] obtained for four pixels can be combined as 8-bit data Cresult by being shifted leftward by 2 bits and added with each other. For example, for cyan color, when it is determined that the large dot is formed in the upper left pixel (PT=1), the small dot is formed in the upper right pixel (PT=2), the medium dot is formed in the lower left pixel (PT=3), and when it is determined that the dot is not formed in the lower right (PT=4), the Cresult which indicates the result of multi-valuing becomes "11 01 10 00".

By doing the processing described above, for a target block, four-valuing corresponding to the normal color is completed for all the pixels. Then, the processing of multi-valuing the black ink amount for each pixel within the block is performed (Step S345). The multi-valuing of the black color pixel which is the special color may be subjected to 4-ary valuing similarly to the representative color ink. However, in a case of being originally determined as a black color pixel (R=G=B=0), the large dot may be formed by the black ink so as to omit the processing of comparing with the threshold value.

In the second embodiment in which the intermediate data acquisition and multi-valuing processing is performed, since the 4-ary valuing is performed for the representative color ink, rich expression of gradation can be achieved and the reproduction of image with high image quality by the representative color ink can be achieved. Also, in such a case, since the representative color ink is based on the average value of 2×2 pixels, the representative color ink to be multi-valued is one per each block, and the processing can be simplified. On the other hand, since data of the original image other than the average value is used for the black color which is the special color, the reproducibility of image is excellent and characters, contour lines, or the like can be reproduced with high accuracy. Accordingly, for characters or contour lines, it is possible to suppress generation of defects such as cutting in line.

It does not matter that modified examples <1> to <5> described in the first embodiment may be applied to the second embodiment as described above. The multi-valuing other than the 4-ary valuing, for example, 3-ary valuing, 5-ary valuing or more, or the like may also be applied. In addition to the method realized by forming dots having different sizes, like the large, medium, and small dots, it does not matter that any of a method of using an ink having a lower dye concentration containing light cyan ink and light magenta ink, or the like, a method realized by ejecting the ink having the same dye concentration a plurality of times, or a combination thereof may be used.

(3) Third Embodiment

Figure 15:
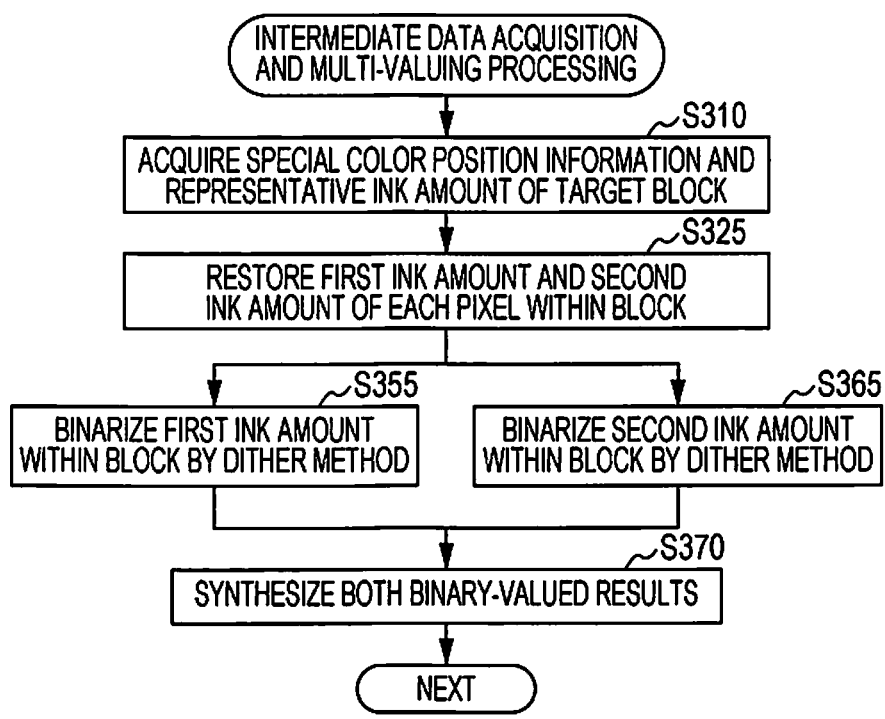
FIG. 15 is a flowchart illustrating a flow of intermediate data acquisition and multi-valuing processing in a third embodiment.

Next, a third embodiment of the invention will be described. The printer 20 of the third embodiment is the same as the printer 20 of the first embodiment, and performs the printing process and the halftone processing described in FIG. 2 and FIG. 4, but the intermediate data acquisition and multi-valuing processing of the printing process is different from that of the first embodiment. In the third embodiment, the processing described in FIG. 15 is performed instead of the intermediate data acquisition and multi-valuing processing described in FIG. 9. The difference between the processing described in FIG. 15 and the intermediate data acquisition and multi-valuing processing described in FIG. 9 is that, in the third embodiment, the halftone processing is performed by setting the same representative ink amount and the same black ink amount for all the blocks constituted with 2×2 pixels and then, processing of combining the results of both ink amounts is performed. Hereinafter, the combining processing will be described in detail with reference to FIG. 15.

When the intermediate data acquisition and multi-valuing processing is initiated in the third embodiment, similarly as in the first embodiment, the processing of acquiring a representative ink amount and special color position information of a target block is performed (Step S310). Here, the acquired representative ink amount and special color position information are the ink amount and information (see FIG. 8 and FIG. 10) generated by the intermediate data generation processing (FIG. 5) described in the first embodiment.

Subsequently, the CMYK ink amount of each pixel is restored from the obtained representative ink amount CmMmYmKm and the special color position information BKp. Although the restoration is performed by setting the representative ink amount CmMmYmKm to the pixel which is not set as the black color pixel and setting an ink amount for black color pixel prepared as the amount of special color ink CkMkYkKk to the pixel which is set as the black color pixel in the first embodiment, data of both the pixels are restored without performing the determination as to whether it is a black color pixel in the third embodiment.

That is, for all the pixels, a first ink amount is obtained as follows.
Upper left pixel data (PT=1) C00=Cm, M00=Mm, Y00=Ym, K00=Km
Upper Right Pixel Data (PT=2) C01=Cm, M01=Mm, Y01=Ym, K01=Km
Lower left pixel data (PT=3) C10=Cm, M10=Mm, Y10=Ym, K10=Km
Lower right pixel data (PT=4) C11=Cm, M11=Mm, Y11=Ym, K11=Km On the other hand, a second ink amount is obtained as follows.
Upper left pixel data (PT=1) C00=Ck, M00=Mk, Y00=Yk, K00=Kk
Upper right pixel data (PT=2) C01=Ck, M01=Mk, Y01=Yk, K01=Kk
Lower left pixel data (PT=3) C10=Ck, M10=Mk, Y10=Yk, K10=Kk
Lower right pixel data (PT=4) C11=Ck, M11=Mk, Y11=Yk, K11=Kk The first ink amount is equal to the representative ink amount obtained by taking an average of pixels within a block. The second ink amount is equal to an ink amount in a case where all the pixels within a block are assumed as the black color pixel which is the special color. In this way, the first and second ink amounts are obtained and then, the binarization is performed on each of the first and second ink amounts by the dither method (Step S355 and Step S365). The binarization method using the dither method is the same as in the first embodiment.

The determination of the binarization in Step S355 and Step S365 of the third embodiment and a recording format of the determination results are represented in the following by taking cyan as an example. In the following, thresh(PT) represents a threshold value corresponding to a pixel PT. The Cm_result and Ck_result are result values that store the results of the binarization, respectively. In Step S355, first, the result value Cm_result is initialized (Cm_result=0). Then, the determinations that are:

If Cm>thresh(1), then Cm_result=Cm_result+1 (upper left dot is ON)
If Cm>thresh(2), then Cm_result=Cm_result+2 (upper left dot is ON)
If Cm>thresh(3), then Cm_result=Cm_result+4 (upper left dot is ON)
If Cm>thresh(4), then Cm_result=Cm_result+8 (upper left dot is ON)
and setting of the Cm_result are performed.

On the other hand, similarly, the result value Ck_result is initialized (Ck_result=0) in Step S365 and further, the determinations that are:
If Ck>thresh(1), then Ck_result=Ck_result+1 (upper left dot is ON)
If Ck>thresh(2), then Ck_result=Ck_result+2 (upper left dot is ON)
If Ck>thresh(3), then Ck_result=Ck_result+4 (upper left dot is ON)
If Ck>thresh(4), then Ck_result=Ck_result+8 (upper left dot is ON)
and setting of the Ck_result are performed.

The processing described above may be sequentially executed by a single CPU 40 and may also be executed in parallel by a CPU capable of executing parallel processing. Then, subsequently, the processing of synthesizing both results of binarization processing is performed (Step S370). Specifically, the synthesization is performed as in the following and the results are saved in the result value C_result.

$$C\_result=(Cm\_result \& (^{\sim}BKp))+(Ck\_result \& BKp)$$

Here, "&" is a logical product operator and "~" is an inversion operator. The BKp is a special color position information, and when the pixel is the black color pixel (R=G=B=0) which is the specific color, 1 is set to the pixel, and when the pixel is not the black color pixel, 0 is set to the pixel. Therefore, the operation described above corresponds to an operation that the result value Ck_result is adopted for the black color pixel and the result value Cm_result is adopted for the pixel which is not the black color pixel. Since the result values for four pixels are shifted by adding a value of 1, 2, 4, or 8 according to pixel positions. As a result, the result values for 2×2 pixels are obtained as 8-bit data for the cyan color. The processing similar to the processing for the cyan color is also performed for magenta M, yellow Y, and black K and finally, the synthesization result is obtained for all inks (Step S370).

In the third embodiment described as above, it does not need to perform the processing of changing the ink amount of each pixel depending on the determination as to whether each pixel is the black color pixel which is the special color. For a case where all the pixels are the first ink amount which is the representative ink amount and a case where all the pixels are the second ink amount corresponding to the black color pixel, the binarization by the dither method is performed for each of the cases, and which is merely execution of the logical product operation and addition. On this account, the number of operations itself increases, but it does not need to perform the determination as to whether the pixel is the black color pixel, and in a case where a cycle time of the CPU 40 is considered, it becomes possible to shorten a total processing time. Furthermore, since the determination of branching is not needed, it becomes easy to perform the intermediate data acquisition and multi-valuing processing in parallel by a plurality of devices. Further, since the branching is not present, it is possible to exhibit sufficient efficiency in a case where pipeline processing is performed.

Furthermore, in a case where a probability of pixel formation is 100% like the second ink amount for the black color pixel which is Ck=Mk=Yk=0 and Kk=255, the processing of Step S365 may be omitted. In this case, the processing time can be further reduced.

(4) Fourth Embodiment

Next, a fourth embodiment of the invention will be described. In the fourth embodiment, the halftone processing in block constituted with a plurality of pixels is realized by combining encode processing using a table which is determined in advance and decode processing. This method is the same as a method described in JP-A-2006-5899 and thus, will be described simply using FIG. 16 to FIG. 21D.

In the fourth embodiment, a basic configuration of the printer 20 and the image processing (FIG. 2), the halftone processing (FIG. 4) are also basically the same. However, in the fourth embodiment, the pixels included in one block are set to be constituted with two pixels in the y-direction and four pixels in the x-direction, and when the intermediate data is saved (Step S240) in the intermediate data generation processing (FIG. 5), the intermediate data is subjected to encoding, which will be described below, and is saved. Accordingly, the number of pixels included in one block becomes 2×4=8 pixels in the fourth embodiment. In this way, in the intermediate data generation processing, an average of gradation values of eight pixels and the average is set as the representative ink amount and also 8-bit information is obtained for the special color position information. Similar to the second embodiment, for each pixel, the large, medium, and small dots can be formed and 4-ary valuing including a dot none is performed and four gradations can be represented for each pixel. Also, one block may be constituted with 2×2 pixels and can be realized by the binarization or the like instead of 4-ary valuing. As will be described in later, although the 4-ary valuing is performed for each pixel in the fourth embodiment, when the block of 2×4 pixels is considered as a unit, additional multi-valuing such as 15-ary valuing is performed. This matter will be described in detail later.

The encode processing at the time when the intermediate data is saved in the intermediate data generation processing is described before the intermediate data acquisition and multi-valuing processing (FIG. 16) is described in the fourth embodiment. In the intermediate data generation processing (FIG. 5), the average of ink amounts of the pixels for the normal color of each block of 2×4 pixels is obtained, and the average is saved as the representative ink amount, together with the special color position information (FIG. 5, Step S240). In this case, in the fourth embodiment, the representative ink amount is encoded with a combination of the classification number and the multi-valued result value to be stored without saving the representative ink amount as it is. In actual, since the classification number, which will be described in later, uniquely corresponds to the block position (Bny, Bnx), if the block position which is currently processed is known, only the multi-valued result value may be stored. If the block is 2×4 pixels, the multi-valuing result is 5-bit and if the block is 2×2 pixels, 4-bit is enough for the multi-valuing result and thus, it is possible to reduce a storage capacity required for saving the intermediate data.

Here, the classification number is a number obtained on the basis of the dither mask 61 having a large size illustrated in FIG. 11A, and is a number given to the block being processed. The dither mask 61 illustrated in FIGS. 11A and 11B has a size of 64 pixels in the y-direction and 256 pixels in the x-direction. When 2×4 threshold groups are extracted from this dither mask as illustrated in FIG. 11B, (64÷2)× (256÷4)=2048, that is, when the dither mask 61 having this size is used, it is possible to extract a total of 2048 kinds of threshold groups. The thresholds included in these threshold groups are basically unique thresholds. The numbers that are sequentially given to the threshold groups from the upper left (0, 0) of the dither mask 61 are the classification number. On the other hand, the original image is larger than the dither mask. Therefore, when the classification number CN [Bny, Bnx] is given to a certain block position (Bny, Bnx) using correspondence with the dither mask 61, $$CN[Bny,Bnx]=64\times\{Bny\}_5\{Bnx\}_6+1 \qquad (1)$$

is obtained. Here, the operator $\{S\}_T$ means that lower T bits are extracted in a case where a variable S is represented in a binary digit. The $\{Bny\}_5$ represents lower 5 binary digits of a number in the y-direction and thus, corresponds to 0 to 31 in a decimal digit. Similarly, the $\{Bnx\}_6$ represents lower 6 binary digits of a x-direction number and thus, corresponds to 0 to 63 in a decimal digit. For example, if a block position is the block position (7, 3), the corresponding position of the dither mask 61 is as illustrated in FIG. 11B, y=14, x=6 in the upper left coordinates of the threshold group, and the classification number CN(7, 3) becomes CN(7, 3)=64×7+ 3+1=452.

Further, eight threshold values are included in a single threshold value group, but when the dots are arranged by being combined with the large, medium, and small data illustrated in FIG. 14 using the threshold values, it is possible to represent with gradations extending from 15 gradations to about 31 gradations for a single threshold value group. That is, when the large, medium, and small dots are arranged in dither continuing way between a state where no dot is formed in eight pixels and a state where the large dot is formed in all the pixels, representations with at most 31 gradations become possible. The combinations in which the zero to eight of three kinds dots of the large, medium, and small dots are arranged in the eight pixels correspond to 164 combinations in total, but in the combination with the threshold, the number of combinations which is actually acquired is merely about 31 combinations. However, the combinations of the gradation values at which gradation switching occurs due to the threshold value are different from each other.

Figure 18:
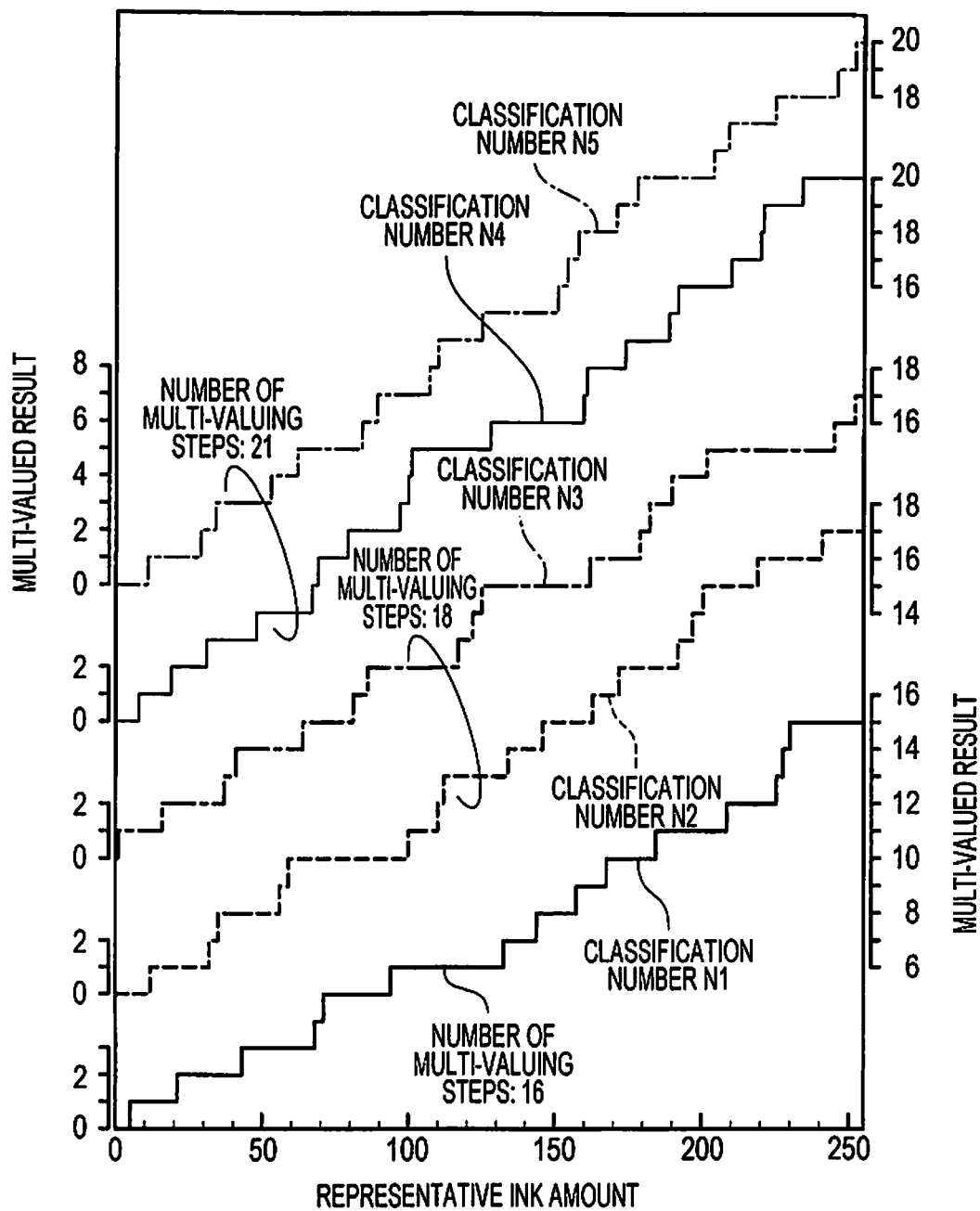
FIG. 18 is an explanatory diagram for conceptually explaining a multi-valued result used in the table of FIG. 17.

FIG. 18 is an explanatory diagram illustrating a state where the multi-valuing result increases stepwise as the representative ink amount increases. In FIG. 18, the multi-valued result value to the representative ink amount is represented using a polygonal line graph formed by taking the representative ink amount in the horizontal axis and the multi-valuing result in the vertical axis. Further, in the drawing, although five blocks having different classification numbers N1 to N5 are represented, the position of the origin point of the multi-valued result value is represented by being deviated in the vertical axis direction little by little in order to avoid that the polygonal lines overlap to make the determination difficult.

As an example, when description is made on the block of the classification number N1 represented by a thick solid line in the drawing, when the representative ink amount is in a range of 0 to 4, the multi-valued result value is "0" but, when the representative ink amount is in a range of 5 to 20, the multi-valued result value is increased to "1". Next, when the representative ink amount is in a range of 21 to 42, the multi-valued result value is increased to "2", and when the representative ink amount is in a range of 43 to 69, the multi-valued result value is increased to "3". As described above, the multi-valued result value also increases stepwise as the representative ink amount increases and finally, the multi-valued result value increases up to "15". That is, in the block of the classification number N1, the representative ink amount capable of taking the range of the gradation values of 0 to 255 is multi-valued (that is, 16-valuing) in a 16-stage consisting of the gradation values of 0 to 15. The switching of multi-valued result value is determined by the combination of the thresholds of the dither mask 61 and the large, medium, and small table.

Similarly, in the block of the classification number N2 represented by a thick broken line or the block of the classification number N3 represented by a thick single-dot chain line in the drawing, the representative ink amount capable of taking the range of the gradation values of 0 to 255 is multi-valued (that is, 18-ary valuing) in an 18-stage consisting of the gradation values of 0 to 17. Further, in the block of the classification number N4 represented by a thin solid line and the block of the classification number N5 represented by a thin single-dot chain line in the drawing, the representative ink amount is multi-valued (that is, 21-ary valuing) in a 21-stage consisting of the gradation values of 0 to 20. As described above, in the fourth embodiment, the number of stages (the number of states capable of being taken as the multi-valuing result) for the multi-valuing of each block are not the same, and the multi-valuing is performed with a unique number of stages according to the classification number. As a result, even in a case where the same representative ink amount is subjected to the multi-valuing, when the classification numbers of the blocks are different, the number of stages for multi-valuing becomes different and different multi-valuing is done.

Figure 17:
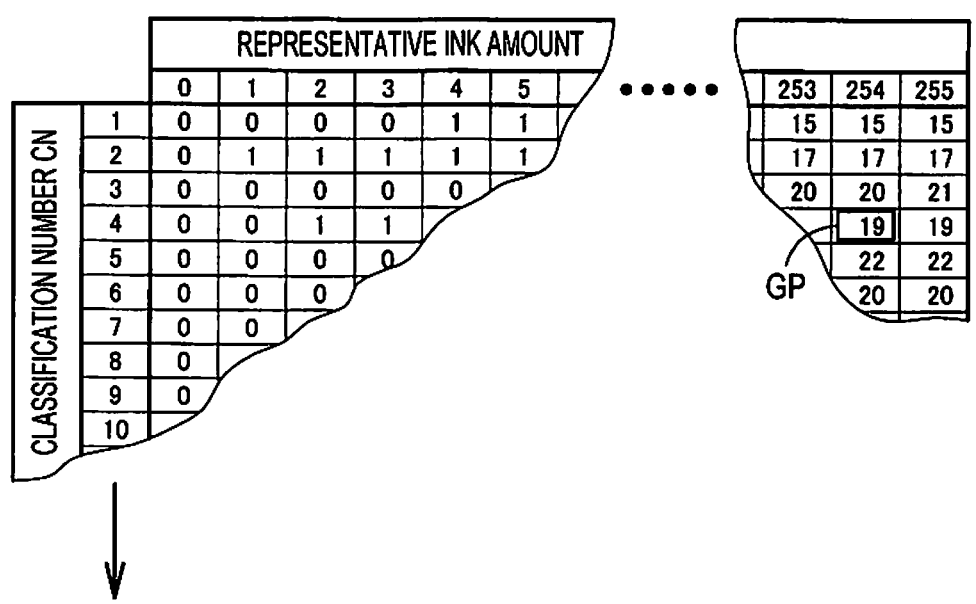
FIG. 17 is an explanatory diagram illustrating a table of a classification number and a representative ink amount used in encoding of a fourth embodiment.

Since the multi-valued result value to the representative ink amount is stored in the multi-valued table illustrated in FIG. 17 for each classification number of the block. The correspondence between the representative ink amount and the representative ink amount is formed of correspondence which is unique for each classification number as illustrated in FIG. 18. When the intermediate data is saved in the intermediate generation processing, the classification number which is given to each block and the multi-valued result value determined by the representative ink amount of the block are combined, that is, data are encoded to be saved. When FIG. 17 is taken as an example, when the block number is (0, 3) and the representative ink amount is 254, the classification number is 4, that is, CN=4, and the multi-valued result value is 19, that is, GP=19, as represented in the equation (1). The classification number uniquely corresponds to the block position (Bny, Bnx) as represented in the equation (1) and the position of the block which is being processed is known, and thus only the multi-valued result value GP may be stored in actual. The multi-valued result value is merely a value of 31 (5-bit) and thus, the data amount can be reduced compared to a case where the representative ink amount is saved as it is.

Figure 16:
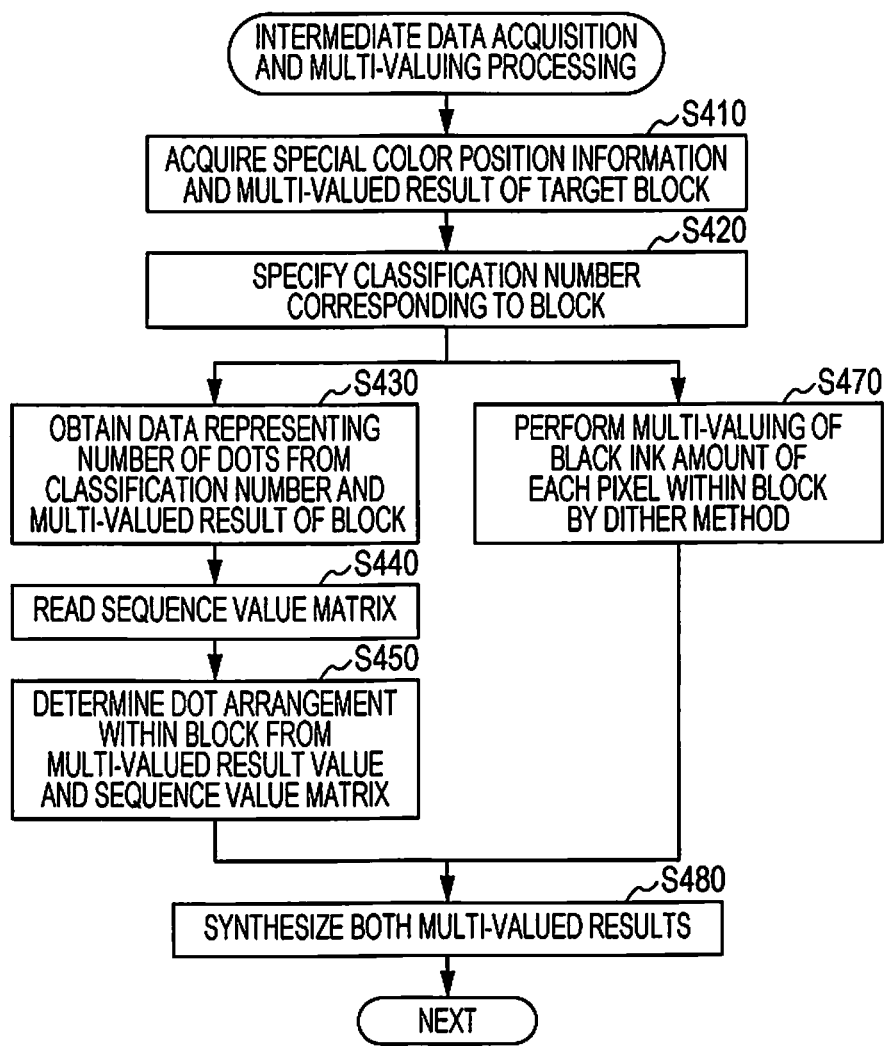
FIG. 16 is a flowchart illustrating a flow of intermediate data acquisition and multi-valuing processing in a fourth embodiment.

In this way, the intermediate data acquisition and multi-valuing processing illustrated in FIG. 16 is initiated in a state where the representative ink amount of each block is saved as the multi-valued result value in the intermediate data generation processing. When this processing is initiated, first, the special color position information and the multi-valued result value of a target block are acquired (Step S410). Then, the processing which specifies the classification number corresponding to the block which is the target from the equation (1) described above is performed (Step S420). The classification number is uniquely obtained from the block position.

Next, the decoding is performed on the basis of the classification number of block and the multi-valued result value, and the decoded data are converted into data representing the number of dots (Step S430). The decoding to be performed is counterpart processing of the encoding illustrated in FIG. 17, and processing for obtaining the data representing the number of dots to be formed in the block using the table illustrated in FIG. 19.

Figure 19:
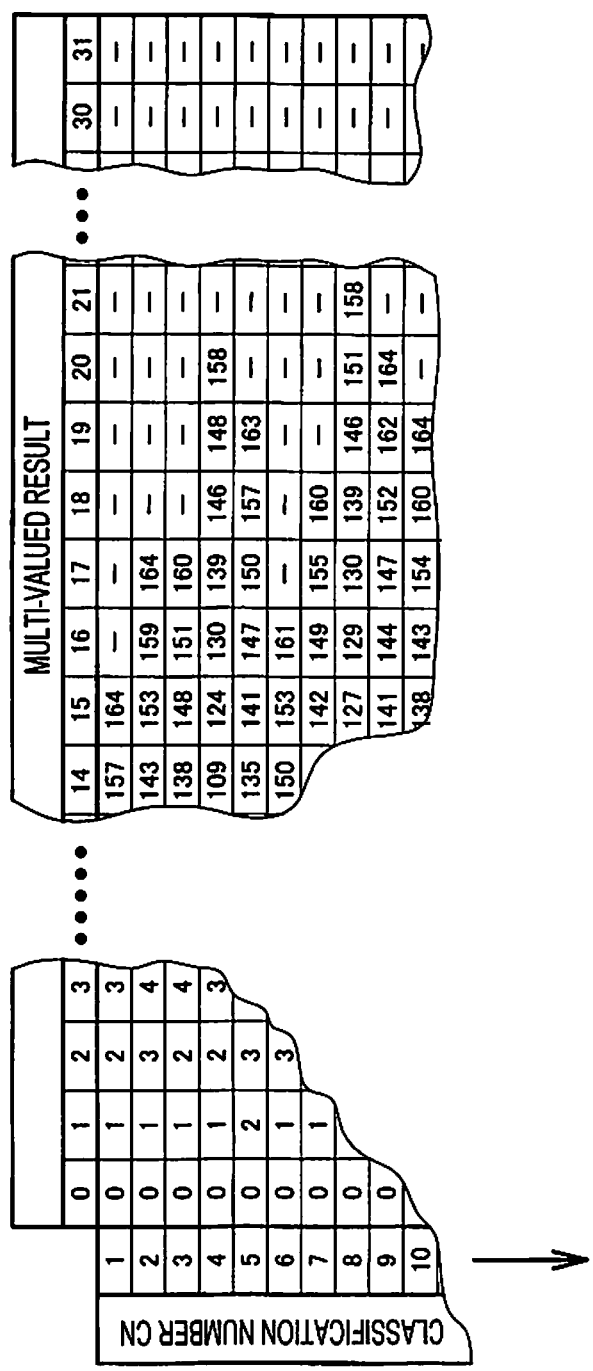
FIG. 19 is an explanatory diagram illustrating a table of a classification number and multi-valued result used in decoding in a fourth embodiment.

FIG. 19 is an explanatory diagram for conceptually illustrating a conversion table which is referred to when the combination of the classification number of the block and the multi-valued result value is converted into the data representing the number of dots. This table is a table for the decoding that obtains the number of dots from the classification number allocated to the block and the multi-valued result value.

As illustrated in FIG. 19, data of the number of dots corresponding to the multi-valued result value are set for each classification number in the conversion table. As an example, when description is made on a block having a classification number 1, "0" is set as the data of the number of dots for a multi-valued result value"0". The data of the number of dots "0" is coded data representing that the number of any of the large, medium, and small dots to be formed is zero. Further, "1" is set as the data of the number of dots for a multi-valued result value"1". The data of the number of dots "1" is coded data representing that the number of the large and medium dots to be formed is zero and the number of the small dot to be formed is one. Further, "164" which is the number of dots is set for a multi-valued result value"15". The data of the number of dots "164" is coded data representing that the number of the large dots to be formed is eight and the number of the medium and small dots are not to be formed.

As described above, in the conversion table, the data representing the number of dots is set as coded data. That is, if the number data can specify the number of dots by a certain method even though the number data does not directly represent the number of dots, the number data can be any type of data.

FIG. 20 is an explanatory diagram illustrating correspondence between the coded number data and a combination of the number of large, medium, and small dots represented by each coded data. As described above, the reason why the number of various types of dots is handled by encoding is as follows.

Since one block is configured by collecting eight pixels, each of the numbers of large, medium, and small dots to be formed can obtain zero to eight values. Accordingly, when each number of dots is represented as it is without encoding the number of dots, a data amount of a total of 12 bits consisting of four bits for each of the number of large dots, the number of medium dots, and the number of small dots is required in order to represent the number of large, medium, and small dots.

In the meantime, since one block is constituted with eight pixels, a total of the number of dots to be formed in the block is eight at most. When considering about each pixel, each pixel can take four states of "a medium dot is formed", "a small dot is formed", "a large dot is formed", and "a dot is not formed". As a result, since the number of combinations of the number of dots capable of forming the block is equal to the number of combinations at the time when the four states are selected eight times by allowing duplication, the number of combinations is calculated with $_4H_8$ ($=4+8-_1C_8$). As a result, only 165 combinations appear at most. Here, $_nH_r$ is an operator with which the number of duplicated combinations is obtained when selections are made r times by allowing duplication among n objects. Furthermore, $_nC_r$ is an operator with which the number of duplicated combinations is obtained when selections are made r times without allowing duplication among n objects. 165 combinations can be represented using 8 bits. Accordingly, when the code number is set to the combination of the number of dots capable of being occurred from reality, the combinations of the number of dots to be formed in the block can be represented by 8 bits. Accordingly, it is possible to reduce the required data amount compared to a case where the formation number of dots to be formed is represented for each dot type by encoding the combination of the number of dots. From this reason, the number data is represented by being encoded as illustrated in FIG. 20 and the coded data of the number of dots are set to the multi-valued result value of each classification number in the conversion table illustrated in FIG. 19.

In this way, the processing for reading a sequence value matrix corresponding to the block after being converted from the classification number and the multi-valued result value into the data representing the number of dots to be formed on the block (Step S440). The sequence value matrix is a matrix in which a sequence number of the dot to be formed on each pixel within the block is set. FIGS. 21A to 21D are explanatory diagrams illustrating a sequence value matrix. As illustrated in FIGS. 21A to 21D, the sequence value matrices are also different for each classification number of the block. The sequence value matrix represents that dots are easily formed within one block. For example, in the sequence value matrix for the classification number 2 illustrated in FIG. 21B, a pixel (pixel having a classification number"1") to be formed at first is a pixel located at a second position from a left end of a lower row and a pixel (pixel having a classification number"2") to be formed at second is a pixel located at the lower right corner. In the sequence value matrix for the classification number 3 illustrated in FIG. 21C, a pixel (pixel having a classification number"1") to be formed at first is a pixel located at a second position from a right end of an upper row and a pixel (pixel having a classification number"2") to be formed at second is a pixel located at the lower left corner.

The sequence value matrix as described above is formed by extracting magnitude relationship of 2×4 threshold value groups from the threshold value groups of the dither mask corresponding to the classification number. For example, in a case of the threshold value group of the classification number 452 illustrated in FIG. 11B, when the magnitude relationship of a line of eight threshold values of "4", "51", "102", "122", "180", "196", "252", and "272" is extracted, the magnitude relationship is represented as 7→2→8→1 sequentially from the left of the first row and 4→6→3→5 sequentially from the left of the second row as illustrated in FIG. 21D.

The sequence value matrices are different by different classification numbers of the block. The sequence value matrices illustrated in FIGS. 21A to 21D correspond to the classification numbers of the block and stored in the EEPROM 60 of the printer 20 in advance. In Step S440 of FIG. 16, the sequence value matrix corresponding to the classification number of the block is read from the EEPROM 60.

When the sequence value matrix corresponding to the block is read, next, processing for determining the dot arrangement in the block is performed (Step S450). This processing is processing for determining the arrangement of the large, medium, and small dots from the decoded number data in the block (FIG. 20) and the sequence value matrix (FIGS. 21A to 21D). In this processing, the number of large, medium, and small dots to be formed in one block is specified and the dots are arranged from the large dot sequentially according to the sequence value of the block. For example, in a case where the encoded number data is 160, since six large dots are formed, two medium dots are formed, and no small dot is formed as illustrated in FIG. 20, the large dots are arranged on six pixels having small sequence values (sequence values of 1 to 6) and the medium dots are arranged on two pixels having next small sequence values (sequence values of 7 and 8) according to one of the sequence value matrices illustrated in FIGS. 21A to 21D.

By the processing described above, the arrangement of the large, medium, and small dots corresponding to the representative ink amount is determined. The description described above is for a specific single color, and similar processing is repeated for four colors of CMYK in actual, and the arrangement of the large, medium, and small dots for each color is determined.

On the other hand, the multi-valuing for the black color pixel is performed from the special color position information obtained in Step S410 (Step S470). This processing is similar to that in other embodiments. The processing in Step S470 may be the binarization described in the second embodiment and may also be the 4-ary valuing on the basis of brightness of the black color pixel.

The arrangement (Step S450) of the large, medium, and small dots for the representative ink amount obtained as described above and the dot arrangement (Step S470) for the black color pixels are synthesized, and the final dot arrangement is determined (Step S480). The combination method is similar to the method described in the third embodiment.

As described above, in the fourth embodiment, the intermediate data is generated by encoding the representative ink amount of the block formed by collecting a plurality of pixels, the dot arrangement is determined by decoding the intermediate data in the intermediate data acquisition and multi-valuing processing. Accordingly, in the fourth embodiment, similarly to other embodiments, it is possible to perform the multi-valuing by making the number of pixels in the halftone processing and the contents of the halftone processing different between the black color which is the special color and the normal color except for the black color. Furthermore, when the intermediate data is generated, it is possible to directly obtain the multi-valued result value by obtaining the representative ink amount and the classification number of block and referring to the multi-valuing table illustrated in FIG. 17. Since the representative ink amount and the classification number of block can be obtained very simply as described above, the multi-valued result value of the representative ink amount in the block can be obtained by processing which is the extremely rapid and very simple.

In addition, since the multi-valued result value can be realized with a small number of bits per block (just 5-bit in the fourth embodiment), it is possible to significantly reduce the data amount than the representative ink amount. Accordingly, it is possible to reduce a storage capacity for the intermediate data.

When the multi-valued result value of each block is received, the printer 20 converts the multi-valued result value into the data representing the number of dots to be formed in the bock. However, the conversion can be rapidly performed by referring to the conversion table illustrated in FIG. 19. Next, the printer 20 prints the image obtained by forming the dots after the presence or absence of the formation of large, medium, and small dots is determined on the basis of the data representing the number of dots obtained by the conversion and the sequence value matrix. When the sequence value matrix is referred to, it is possible to simply determine the pixel for which the large, medium, and small dots are to be formed. Accordingly, as a whole, it is possible to rapidly determine the arrangement of the large, medium, and small dots for each block and to rapidly print the image.

In the fourth embodiment, it is possible to print the image with sufficient image quality simply and rapidly for the black color pixel as well. For the normal color, since the multi-valuing table, the conversion table, and the sequence value matrix are set on the basis of the dither mask, it is possible to reflect characteristics of the dither mask in the dot arrangement. Accordingly, when the dither mask has characteristics of so-called blue noise or green noise, it is possible to print a high quality image in which the dots are distributed favorably.

In the fourth embodiment, when the intermediate data are saved, the value encoded using the encode table illustrated in FIG. 17 is saved but, the representative ink amount may be saved in the intermediate data generation processing and the encoding and decoding may be performed in the intermediate data acquisition and multi-valuing processing. It does not need to apply the same method to all the representative colors and it does not matter that the size of block mat be changed by the color or the combination of the encode and decode table may be changed. Further, other encoding and decoding method disclosed in JP-A-2006-5899 may also be applied.

As having been described above, while the embodiment of the invention has been described using the first to fourth embodiments, modification as described in the modified example of the first embodiment can also be realized in other embodiments. The halftone method of the special color and the color (normal color) other than the special color can be combined in various ways. For example, it does not matter that the error diffusion method is performed for the special color or the processing using the encoding and decoding in the fourth embodiment is performed for the special color.

The invention is not limited to the embodiments described above and can also be embodied in various aspects within a range without departing from the gist of invention. For example, it does not matter that the number of pixels handled as a block is the number of pixels other than 2×2 pixels or 2×4 pixels. The shape of the block is not limited to a rectangle and may be any shape as long as a shape capable of forming an image. The number of pixels to be included in each block does not need to be the same. The special color is not limited to a black color and other color may also be the special color, and a combination of a plurality of colors may be handled as the special color. Different halftone proceeding do not need to be two kinds of halftone proceeding and the color other than the special color is further divided into a plurality of colors and different halftone processing may be prepared for the plurality of colors. Otherwise, in a case where the plurality of colors are set as the special color, different halftone processing may be prepared for each color.

What is claimed is:

1. An image processing apparatus which converts an original image into a representation obtained by using a plurality of inks, the image processing apparatus comprising:
    a processor configured to perform first halftone processing which is determined in advance, and second halftone processing which is different from the first halftone processing,
    the processor being further configured to perform the second halftone processing, for a second kind of color which is a color other than a first kind of color, which is a single color or a plurality of colors determined in advance among a plurality of colors constituting the original image, in units of blocks each consisting of a plurality of pixels that constitute the original image and convert the second kind of color into an amount of second kind of ink corresponding to the second kind of color among the plurality of inks,
    the processor being further configured to perform the first halftone processing, for the first kind of color, for each pixel that constitutes the original image or each pixel group each having a smaller number of pixels than the block and convert the first kind of color into an amount of first kind of ink corresponding to the first kind of color among the plurality of inks, with the first kind of color including at least a black color, and
    the processor being further configured to send the amount of the first kind of ink and the amount of the second kind of ink for improving quality of printing of the representation using a printer head based on the amount of the first kind of ink and the amount of the second kind of ink.

2. The image processing apparatus according to claim 1, wherein the first halftone processing is processing with image quality higher than the second halftone processing.

3. The image processing apparatus according to claim 1, wherein the first kind of color includes only the black color.

4. The image processing apparatus according to claim 1, wherein the first halftone processing is processing which directly determines whether or not dots are to be formed by the first kind of ink corresponding to the first kind of color on the basis of a gradation value of the first kind of color.

5. The image processing apparatus according to claim 1, wherein the second halftone processing is processing performed at a higher speed than the first halftone processing.

6. The image processing apparatus according to claim 5, wherein the second halftone processing is processing of comparing a threshold value stored in a dither mask with the gradation value of the second kind of color, in units of the blocks.

7. The image processing apparatus according to claim 1, wherein the processor is configured to perform the processing for the second kind of color using an average value of the plurality of pixels within the block.

8. The image processing apparatus according to claim 1, wherein the processor is configured to determine, for the first kind of color, whether or not the first kind of color is present in any of the pixels within the block and perform the first halftone processing only on the pixel in which the first kind of color is present.

9. An image processing apparatus which converts an original image into a representation obtained by using a plurality of inks, the image processing apparatus comprising:
   a processor configured to perform first halftone processing which is determined in advance, and second halftone processing which is different from the first halftone processing,
   the processor being further configured to perform the second halftone processing, for a second kind of color which is a color other than a first kind of color, which is a single color or a plurality of colors determined in advance among a plurality of colors constituting the original image, in units of blocks each consisting of a plurality of pixels that constitute the original image and convert the second kind of color into an amount of second kind of ink corresponding to the second kind of color among the plurality of inks,
   the processor being further configured to perform the first halftone processing, for the first kind of color, for each pixel that constitutes the original image or each pixel group each having a smaller number of pixels than the block and convert the first kind of color into an amount of first kind of ink corresponding to the first kind of color among the plurality of inks, and
   the first halftone processing and the second halftone processing being performed for all the pixels of the original image and an ink amount of the second kind of ink being replaced with the ink amount of the first kind of ink for the pixel in which the ink amount of an ink corresponding to the first kind of color which is the processing result is not zero.

10. An image processing apparatus which converts an original image into a representation obtained by using a plurality of inks, the image processing apparatus comprising:
   a processor configured to perform first halftone processing which is determined in advance, and second halftone processing which is different from the first halftone processing,
   the processor being further configured to perform the second halftone processing, for a second kind of color which is a color other than a first kind of color, which is a single color or a plurality of colors determined in advance among a plurality of colors constituting the original image, in units of blocks each consisting of a plurality of pixels that constitute the original image and convert the second kind of color into an amount of second kind of ink corresponding to the second kind of color among the plurality of inks,
   the processor being further configured to perform the first halftone processing, for the first kind of color, for each pixel that constitutes the original image or each pixel group each having a smaller number of pixels than the block and convert the first kind of color into an amount of first kind of ink corresponding to the first kind of color among the plurality of inks,
   the processor performing the first halftone processing by defining a color of all the pixels as the first kind of color in a case where the first kind of color is present in any of the pixels within the block, and
   the image processing apparatus further comprising a halftone processing results synthesization unit which synthesizes a result of the first halftone processing and a result of the second halftone processing on the basis of a position of the pixel in which the first kind of color is present to obtain a result of the image processing.

11. An image processing apparatus which converts an original image into a representation obtained by using a plurality of inks, the image processing apparatus comprising:
   a processor configured to perform first halftone processing which is determined in advance, and second halftone processing which is different from the first halftone processing,
   the processor being further configured to perform the second halftone processing, for a second kind of color which is a color other than a first kind of color, which is a single color or a plurality of colors determined in advance among a plurality of colors constituting the original image, in units of blocks each consisting of a plurality of pixels that constitute the original image and convert the second kind of color into an amount of second kind of ink corresponding to the second kind of color among the plurality of inks,
   the processor being further configured to perform the first halftone processing, for the first kind of color, for each pixel that constitutes the original image or each pixel group each having a smaller number of pixels than the block and convert the first kind of color into an amount of first kind of ink corresponding to the first kind of color among the plurality of inks,
   first processing of defining a bundle of rasters each of which is an arrangement of pixels arranged in one direction in the original image as a processing raster, the processing raster including at least one of the blocks handled by the processor, and second processing of generating intermediate data obtained by combining an ink amount obtained by converting gradation data of the second kind of color in units of blocks into an ink amount of the corresponding second kind of ink, and an ink amount of the first kind of ink that corresponds to the first kind of color of each pixel or each pixel group having a smaller number of pixels than the block for each processing raster being performed, and
   the intermediate data being processed by the processor so as to generate dot data that represents the presence or absence of dots to be formed that correspond to the ink amount of the first kind of ink and the second kind of ink.

12. The image processing apparatus according to claim 11, wherein the intermediate data generated in the second halftone processing is stored in a form encoded with the amount of ink obtained by converting gradation data of the second kind of color in units of blocks into an ink amount of the corresponding second kind of ink and information about the number of dots to be formed in the block and a dot position in the block.

13. The image processing apparatus according to claim 12,
wherein a dither mask which is larger than the block is prepared, and
the encoding is performed by encoding the comparison result of a number of threshold values corresponding to the number of pixels included in the block in threshold values included in the dither mask with the ink amount of the second kind of ink.

14. The image processing apparatus according to claim 13,
wherein the dither mask which is larger than the block is prepared, and
the encoding is performed by combining information obtained by ranking sizes of a number of thresholds corresponding to the number of pixels included in the block in the threshold values included in the dither mask and the number of dots to be formed in the block determined on the basis of the ink amount of the second kind of ink.

15. An image processing method for converting an original image into a representation obtained by using a plurality of inks, the image processing method comprising:
performing first halftone processing which is determined in advance; and
performing second halftone processing which is different from the first halftone processing,
wherein the second halftone processing is performed, for a second kind of color which is a color other than a first kind of color which is a single color or a plurality of colors determined in advance among a plurality of colors constituting the original image in units of blocks each consisting of a plurality of pixels that constitute the original image and the second kind of color is converted into an amount of second kind of ink corresponding to the second kind of color among the plurality of inks, and
wherein the first halftone processing is performed, for the first kind of color, for each pixel that constitutes the original image or each pixel group having a smaller number of pixels than the block and the first kind of color is converted into an amount of first kind of ink corresponding to the first kind of color among the plurality of inks, with the first kind of color including at least a black color.

\* \* \* \* \*